US012412005B2

(12) United States Patent
Strader et al.

(10) Patent No.: US 12,412,005 B2
(45) Date of Patent: Sep. 9, 2025

(54) SYSTEMS AND METHODS TO MODEL A SITE

(71) Applicant: Speed of Light Ops, LLC, Lehi, UT (US)

(72) Inventors: Dennis J. Strader, Eagle Mountain, UT (US); Ryan H. Nelson, Highland, UT (US); Landon J. Anderton, Cottonwood Heights, UT (US); Daniel S. Goodrick, Saratoga Springs, UT (US); Merrill E. McKee, Clearwater, FL (US); Cheng Zhang, Lutz, FL (US); Matthew G. Van Orman, Eagle Mountain, UT (US); Orrin C. Naylor, Colorado City, AZ (US)

(73) Assignee: Speed of Light OPS, LLC, Lehi, UT (US)

( * ) Notice: Subject to any disclaimer, the term of this patent is extended or adjusted under 35 U.S.C. 154(b) by 108 days.

(21) Appl. No.: 18/070,367

(22) Filed: Nov. 28, 2022

(65) Prior Publication Data

US 2023/0169731 A1    Jun. 1, 2023

Related U.S. Application Data

(60) Provisional application No. 63/264,657, filed on Nov. 29, 2021.

(51) Int. Cl.
*G06F 30/20* (2020.01)
*G06F 30/13* (2020.01)
(Continued)

(52) U.S. Cl.
CPC .............. *G06F 30/20* (2020.01); *G06F 30/13* (2020.01); *G06T 7/12* (2017.01); *G06T 7/13* (2017.01);
(Continued)

(58) Field of Classification Search
CPC ...... G06F 30/20; G06F 30/13; G06F 2119/12; G06F 30/27; G06F 2119/06;
(Continued)

(56) References Cited

U.S. PATENT DOCUMENTS 8,209,152 B2   6/2012  Pershing
9,041,915 B2   5/2015  Earhart et al.
(Continued)

FOREIGN PATENT DOCUMENTS

WO    WO-2014/033511 A1    3/2014

OTHER PUBLICATIONS

Zhuang, Yixin et al. "A General and Efficient Method for Finding Cycles in 3D Curve Networks." ACM transactions on graphics 32.6 (2013): 1-10. Web. (Year: 2013).*
(Continued)

*Primary Examiner* — Jeffery A Brier
(74) *Attorney, Agent, or Firm* — Foley & Lardner LLP

(57) ABSTRACT

Systems and methods are disclosed herein for generating and/or providing a model, such as may be utilized for designing and/or presenting a proposal for a project for a structure or site. The disclosed embodiments can include identifying installation surface faces, installation surface face benefit metrics, obstructions, obstacles affecting placement of elements of the project, and for providing an educational experience, comprising general information and at least one structure-specific installation proposal. A selected plan can be implemented from within a proposal platform of the disclosed systems and methods.

20 Claims, 16 Drawing Sheets

(51) Int. Cl.
*G06F 119/12* (2020.01)
*G06T 7/12* (2017.01)
*G06T 7/13* (2017.01)
*G06T 7/60* (2017.01)
*G06T 7/73* (2017.01)
*G06T 15/60* (2006.01)
*G06T 17/05* (2011.01)
*G06T 17/10* (2006.01)
*G06T 17/20* (2006.01)
*G06V 10/44* (2022.01)
*G06V 10/82* (2022.01)
*G06V 20/10* (2022.01)
*G06V 20/17* (2022.01)

(52) U.S. Cl.
CPC ............... *G06T 7/60* (2013.01); *G06T 7/73* (2017.01); *G06T 15/60* (2013.01); *G06T 17/05* (2013.01); *G06T 17/10* (2013.01); *G06T 17/20* (2013.01); *G06V 10/44* (2022.01); *G06V 10/82* (2022.01); *G06V 20/17* (2022.01); *G06V 20/176* (2022.01); *G06F 2119/12* (2020.01); *G06T 2200/08* (2013.01); *G06T 2207/10012* (2013.01); *G06T 2207/10028* (2013.01); *G06T 2207/10032* (2013.01); *G06T 2207/20084* (2013.01); *G06T 2210/56* (2013.01)

(58) Field of Classification Search
CPC .......... G06F 2111/10; G06T 7/12; G06T 7/13; G06T 7/60; G06T 7/73; G06T 15/60; G06T 17/05; G06T 17/10; G06T 17/20; G06T 2200/08; G06T 2207/10012; G06T 2207/10028; G06T 2207/10032; G06T 2207/20084; G06T 2210/56; G06T 2207/30192; G06V 10/44; G06V 10/82; G06V 20/17; G06V 20/176; G01B 21/28; G06Q 10/06
See application file for complete search history.

(56) References Cited

U.S. PATENT DOCUMENTS

| | | |
|---|---|---|
| 9,589,079 B2 | 3/2017 | Morse et al. |
| 10,140,401 B1 | 11/2018 | Hoff |
| 10,409,925 B1 | 9/2019 | Hoff |
| 10,528,960 B2 | 1/2020 | Pershing et al. |
| 10,970,591 B2 | 4/2021 | Ananthakrishnan et al. |
| 11,043,026 B1 | 6/2021 | Fathi et al. |
| 11,238,193 B2 | 2/2022 | Hoff |
| 11,537,808 B2 | 12/2022 | Crouch et al. |
| 12,014,433 B1 | 6/2024 | Pearson et al. |
| 2012/0035887 A1 | 2/2012 | Augenbraun et al. |
| 2014/0046627 A1* | 2/2014 | Pershing ............... G01B 21/28 702/156 |
| 2014/0188571 A1 | 7/2014 | Han et al. |
| 2015/0066442 A1 | 3/2015 | Pryor |
| 2016/0103160 A1 | 4/2016 | Chen et al. |
| 2017/0206648 A1* | 7/2017 | Marra ................... B64D 47/08 |
| 2017/0228913 A1 | 8/2017 | Kogan et al. |
| 2017/0302077 A1 | 10/2017 | Yabe et al. |
| 2019/0156570 A1 | 5/2019 | Sanjurjo et al. |
| 2019/0188337 A1* | 6/2019 | Keane ................... G06Q 50/16 |
| 2019/0234638 A1 | 8/2019 | Song et al. |
| 2019/0279420 A1 | 9/2019 | Moreno et al. |
| 2019/0303707 A1 | 10/2019 | Ananthakrishnan et al. |
| 2020/0293773 A1 | 9/2020 | Loveland et al. |
| 2021/0272358 A1 | 9/2021 | Stevens et al. |
| 2022/0237858 A1 | 7/2022 | Dubost et al. |
| 2022/0335176 A1 | 10/2022 | Haddock et al. |
| 2022/0366646 A1* | 11/2022 | Lopez Gavilan ....... G06T 17/00 |

OTHER PUBLICATIONS

MathWorks. "Release Notes R2021a MATLAB & Simulink" (Mar. 2021). https://www.mathworks.com/help/matlab/release-notes-R2021a.html (Year: 2021).*

* cited by examiner

SYSTEMS AND METHODS TO MODEL A SITE

RELATED APPLICATIONS

The present application claims the benefit of priority under 35 U.S.C. Section 119(e) of U.S. Provisional Patent Application No. 63/264,657 entitled SYSTEMS AND METHODS TO PROPOSE AN INSTALLATION, filed Nov. 29, 2021, which is hereby incorporated by reference herein in its entirety.

TECHNICAL FIELD

The present disclosure is directed to generating and/or presenting a model of a site.

SUMMARY

The present disclosure is directed to systems and methods to generate and/or present or otherwise provide a model of a site. For example, the present disclosure is directed to systems and methods to generate highly accurate models, such as may be used to present sophisticated, dynamic and/or interactive proposals (e.g., through a sales representative to a potential customer). The model of a site can include one or more structures and/or landscape. The embodiments of the present disclosure and/or models generated therefrom can be utilized for site enhancement, including but not limited to surveillance, security, maintenance, and improvement (e.g., installation). Similarly, the system and methods herein described may be used with regard to site clearing, modification, restoration, rejuvenation, etc. Similarly, models generated from embodiments of the present disclosure can be utilized, such as for simulation, gaming, research, presentation, and any other suitable purpose.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
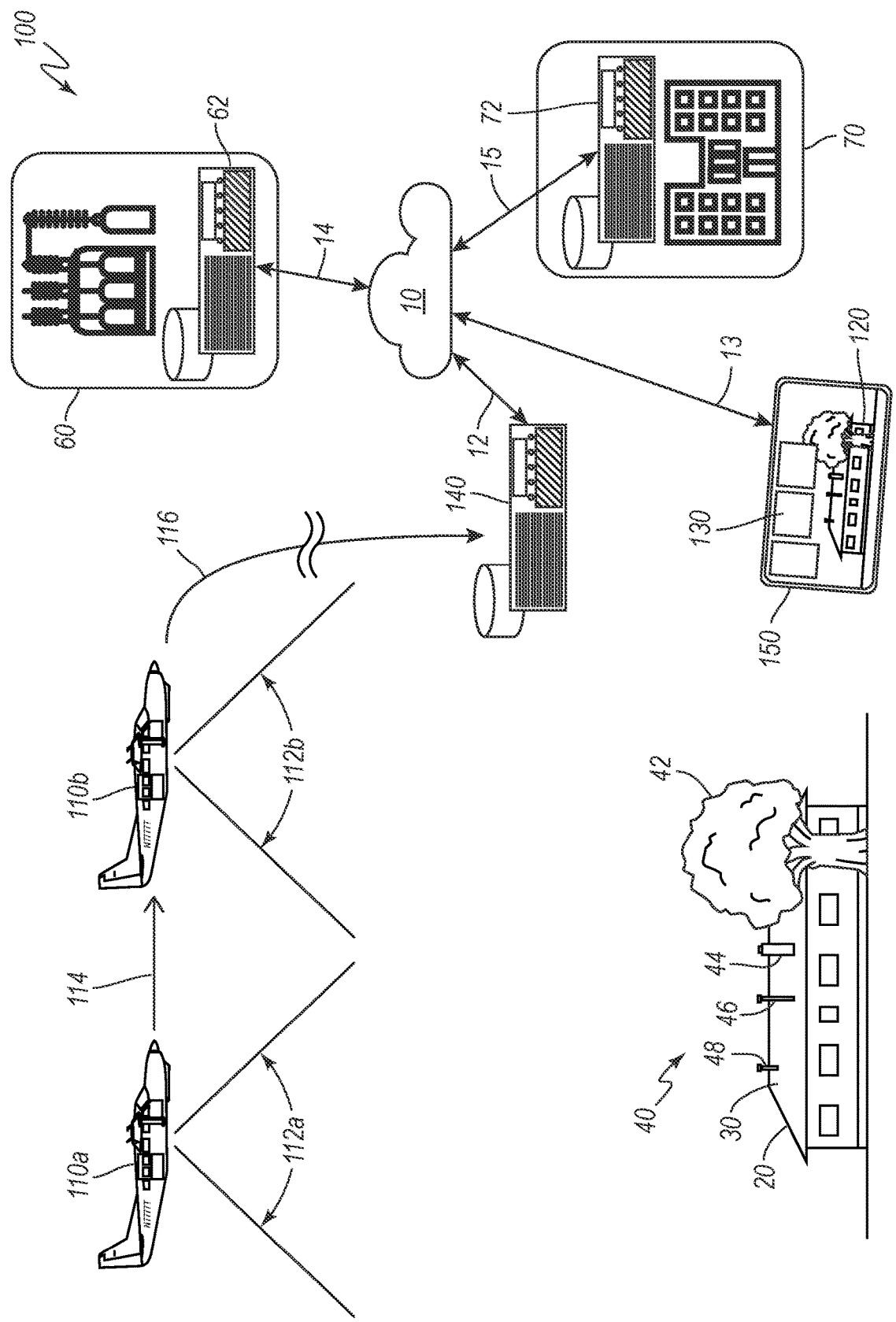
FIG. 1 is a diagram of a project proposal system (PPS), according to one embodiment of the present disclosure.

Enhancement of a site can be facilitated by proposals communicating information about the site. The present disclosure also provides embodiments for generating a model of a site, such as may be utilized in generating a proposal for an installation or a variety of other applications benefited by a three-dimensional model. The model may be utilized in any suitable manner, such as for proposals for installations and/or projects at a site.

The following description describes embodiments of the present disclosure with primary reference to systems and methods of generating and/or providing proposals directed toward solar electricity generation systems ("solar energy systems"). The reference to and focus on solar is only an example, as a matter of convenience, and not by way of limitation as other applications, e.g., roofing, etc., are also anticipated.

Selling solar electricity generation systems can be aided by providing customized information to a potential customer that is specific to a property and/or potential installation site of the potential customer. Information such as potential placement of solar panels and/or ultimate generation of electricity as a result of such placement can help a potential customer understand the scope and/or weigh the factors that are considered in a decision to install a solar electricity generation system.

Introducing and educating potential customers to solar electricity generation installation and ultimately closing a sale has traditionally been a multi-touch, time intensive sales cycle. Proposals to provide potential customers with customized information specific to a property and/or potential installation site are typically hard copies or static electronic documents (e.g., portable document format (.pdf)) that provide static information. When the potential customer raises an objection or concern that leads to a new proposal design, a sales rep is required to either leave (or otherwise disengage from the potential customer) and create a new proposal or request that support staff (e.g., at a support office) generate the new proposal, thereby elongating the sales process. This repeated, time-consuming regenerating of proposals over the course of one or more meetings of the sales rep with the potential customer can be burdensome to the potential customer (and the sales rep) and often leads to a lost sale.

The customized information of a proposal is more useful to a potential customer when it includes solar production and shading analysis specific to the property and/or potential installation site. Solar production and shading analysis can be generated from three-dimensional ("3D") data. Presently, available 3D data is, in many urban areas, limited to what can be obtained by sophisticated instruments attached to planes that can be flown at low altitudes over population centers to survey the structures. (Contractors that conduct the flyovers typically focus mainly on high population centers.) Rural and smaller population centers are often excluded from high volume data collection (although they may be served by Unmanned Aerial System ("UAS") (see US Code of Federal Regulation 14, CFR 107.3 (last updated Nov. 14, 2022)) equipment), or the available data is outdated or of low-quality. Alternatively, a 3D model can be manually created with market-available do-it-yourself ("DIY") tools. However, low volume collection methods (UAS-served, for example) and, more particularly, manual DIY tools leave room for human error, subjective decisions, slower return times, and an increase in manual labor cost.

Another shortcoming of the present approach and challenge is that generating a high quality and informative proposal depends heavily on the designer of the proposal document understanding solar design and the technical details of azimuth, tilts, panel orientation, shading analysis, equipment, utilities, and others. Because the designer is often also a sales rep (e.g., individual trying to make a sale), obvious disincentives to accurately portray solar best practices arise because the proposal designer/sales rep earns more commissions for larger systems.

Prior to a sales representative pitching a bid for installation of a solar energy system, they also typically take time educating the potential customer and answering questions on nuances of solar electricity generation. Solar (e.g., including solar electricity generation generally and solar energy systems specifically) is a new, interesting topic for many homeowners but they often don't know where to start investigating or researching this buying decision.

In view of the foregoing considerations and factors, the present disclosure provides improved systems and methods to generate and/or present a proposal (e.g., a digital interactive solar proposal) for a solar energy system (or similar proposal) to a potential customer. The systems and methods of the present disclosure provide for generating and presenting an interactive solar energy system proposal to a potential customer (potentially providing a wider footprint), without reliance on light detection and ranging ("LiDAR") instruments while removing aspects involving a human element that are thus error prone.

The disclosed systems and methods to generate and/or present a proposal for a solar energy system to a potential customer can be automated to quickly provide highly accurate solar production models and to deliver sophisticated and dynamic solar sales proposals to sales reps in substantially "live time" (e.g., while the sales rep remains engaged with the customer, within a few minutes).

The disclosed systems and methods can also, prior to delivering a proposal, immediately or near immediately provide sales reps with a Preposal™ (e.g., information in a presentation format provided preparatory to, "pre-," or in advance of a proposal) to use for educating a potential customer while they are waiting for their proposal to be completed. The sales rep and potential customer have an immediate opportunity to begin the sales conversation and experience a seamless transition into the solar design, pricing metrics, and checkout.

The disclosed systems and methods can include one or more of: onboarding, automated ordering, Preposal™ delivery, generating a 3D Point Cloud, roof face identification, roof face optimization, roof face modeling, structure modeling, tree and perimeter object detection and simulation, sun path simulations, roof obstacle and penetrations detection, roof lines and measurements, solar panel placement, energy production calculations; editing solar cell placement within design, manual 2D override to optimize 3D polygons, and delivery of 3D solar/roof design (e.g., in a web-based 3D display tool).

As used herein, the term "solar maximum day" refers to a day of the year (e.g., typically the summer solstice) whereupon a greatest amount of solar radiation falls upon a particular location.

As used herein, the term "solar minimum day" refers to a day of the year (e.g., typically the winter solstice) whereupon a least amount of solar radiation falls upon a particular location.

As used herein, the term "site" refers to definable space at a location without reference to any feature of the location, e.g., a geolocation (a "pinpoint") along with a threshold surrounding area, regardless of what may be at or near the site. A geolocation and threshold surrounding area may be represented, e.g., by a legal property description.

As used herein, the term "structure" refers to a feature of a site without regard for the feature origin. A structure may be any improvement (e.g., a manmade feature) on a site, such as a building, a tower, a sign, a canal, etc.; a definable area of a site having some bounding feature (physical or logical); an area of a site bounded only by a definition of the site itself; and so forth without limitation.

An object of interest can be any object at a site that can be identified from imagery. A structure can be an example of an object of interest at a site. In some embodiments, an object of interest can be a geographic feature (e.g., a hill, a gulch, a volcano, a body of water). In some embodiments, an object of interest can be a living organism, such as a plant (e.g., tree) or animal (e.g., an endangered species).

As used herein, the term "GPS" refers to a global positioning system employing a constellation of satellites to determine, to reasonable degrees of accuracy and precision, a location at or near the surface of the earth (including above or below the earth's surface). The present disclosure anticipates an alternative (or successor) geolocation system; however, GPS is used throughout and is intended to cover any suitable geolocation system.

As used herein, the term "obstruction" refers to a physical object which may not physically impede on a structure but nevertheless impairs some aspect of the structure such as, e.g., casting a shadow on/over the structure or a portion of the structure. Examples of obstructions include trees, adjacent structures, elevated terrain, etc.

As used herein, the term "obstacle" refers to a physical or logical object which impedes on a structure or a portion of a structure. An obstacle may be any object disposed on, against, over, around, or adjacent to the structure. Examples of obstacles include penetrations (a vent, a fan, an antenna, a chimney, etc.), an electrical drop, an easement (such as a utility easement), etc.

As used herein, the term "insolation" refers to exposure of a definable entity to solar radiation, regardless of how the solar radiation is measured, expressed, or described. The definable entity may be a surface of interest, such as a roof of a structure, a face of roof, an area of ground, etc.

FIG. 1 is a diagram of a project proposal system (PPS) 100, according to one embodiment of the present disclosure. The PPS 100 is a system configured to design a solar energy system and to provide a digital interactive solar proposal (hereafter, "proposal") for a solar energy system. While the embodiment of FIG. 1 takes the form of providing an interactive digital proposal for installation of a solar energy system, the systems and methods herein disclosed include components and functionality that are similarly suitable for providing an interactive digital proposal for other purposes, e.g., building a sun shade, laying out a garden, generating a structural design, organizing property rehabilitation, etc., and the present disclosure anticipates such other purposes. More particularly, the present embodiment is directed toward a solar energy system installed to a roof 30, any surface of interest could be used, such as, e.g., a roof face, a top surface of a structure, a surface with a skyward exposure (including a wall, a dome, an eccentric roof, etc.), an inferred surface (e.g., a pergola, a space defined by poles, etc.), a mount, a pole, etc., and may encompass a ground-level project, or even an excavated project. In one embodiment, the PPS 100 determines solar production, e.g., of a surface at a site of a potential solar electrical generation system.

The PPS 100 receives data for and/or information about a site 40, which may include a structure 20 and/or additional features. The PPS 100 comprises a PPS server 140 and a tablet computer 150 (or other client and/or mobile computing device). The PPS 100 may implement or otherwise provide a platform accessible by one or more users and/or entities that provide data to or otherwise interface with the PPS 100 to enable design of solar energy systems and/or proposals for the same. For example, the platform provided by the PPS 100 may comprise a sales representative-facing platform that enables sales representatives to receive Preposal™ and/or proposal data and seamlessly present the Preposal™ and proposal data to potential customers (e.g., an owner of a site and/or structure of a site). The PPS 100 may further employ an aircraft 110a, 110b and a communication system 10 (or network), and may obtain or otherwise receive data from an electrical grid system ("EGS") 60 and/or a solar energy equipment provider ("SEEP") 70. The communication system 10 may be the Internet, a public network, a private network, a virtual private network, or a combination of these and/or similar communication networks; and is hereafter referred to as the Internet 10. The Internet 10 may comprise, permit, or facilitate bidirectional communication 12, 13, 14, 15 with, respectively, the PPS server 140, the tablet computer 150, the EGS 60 (more particularly, with a server 62 of the EGS 60) and the SEEP (more particularly, with a server 72 of the SEEP 70).

In FIG. 1, the structure 20 is a residential building (hereafter, "structure" 20). The structure 20 represents a residential building; however, this is only for convenience of the disclosure, and systems and methods herein described are equally applicable to any object of interest, structure, a site, or even to a defined ground surface. The structure 20 comprises a roof 30 and is positioned on or at a site 40 that may include features or objects in addition to the structure 20 that may be at least considerations when designing a solar energy system for the structure 20 and/or the site 40. While reference herein is made to a roof 30, in some instances, an analogous feature may be applicable, such as a concrete pad, an area of ground, etc. An object of interest can have a top surface, which can be analogous to a roof (i.e., a roof is an example of a top surface of an object of interest).

The site 40 may include features such as a nearby tree 42, towers, poles, a building or other structure, a chimney 44, vents 46, 48, etc. Some features of the site 40 may affect the degree to which sunlight strikes the roof 30 (obstruct or partially obstruct) and/or may impinge on solar panel placement (as an obstacle).

The reference label 110a represents an aircraft in a first position, while 110b represents an aircraft in a second position, and 110x (not illustrated) refers to an aircraft generally. The aircraft 110x may be a manned aircraft (a fixed wing or rotary wing aircraft) or a UAS. The aircraft 110x may be configured to capture images of terrain and features at the earth's surface, including a plurality of sites. The images may take the form of photogrammetry source and/or output images, stereoscopic images (such as the stereoscopic images 202, 202s in FIG. 2A), video frames, etc. The present disclosure refers to the use of stereoscopic images for convenience only and not by way of limitation, and use of other image types is anticipated. The aircraft 110a may capture a first stereoscopic image of terrain and features over which the aircraft 110a is flying. A capture angle 112a for the first stereoscopic image is shown for reference. The aircraft 110a may travel 114 an appropriate distance and capture a second stereoscopic image having a capture angle 112b. In one embodiment, the first stereoscopic image may be captured by a first aircraft 110x and the second stereoscopic image may be captured by a second aircraft 110x. The structure 20 is within the capture angles 112a, 112b of the aircraft 110a, 110b. The first and second stereoscopic images may be subject to various computer-based algorithmic processing before being delivered 116 to the PPS server 140.

An owner (e.g., a potential customer or other appropriate individual) (hereafter, "owner") may request a solar proposal for a solar energy system. A sales representative may request the proposal on behalf of the owner. The tablet computer 150 may be used to initiate preparation of the proposal. The tablet computer 150 may communicate 12, 13 via the Internet 10 with the PPS server 140 to cause various computer-based processes (further discussed in conjunction with FIGS. 2A-3) to occur whereby the proposal may be generated. The stereoscopic images are used to generate point cloud data including points of the structure 20 and the features of the site 40. The PPS server 140 may use the point cloud data and one or more neural networks (further discussed below) to identify faces of the roof 30, and to determine the insolation (e.g., irradiance, irradiation, total solar resource fraction (TSRF), solar access) of each face of the roof 30, as described below. The PPS server 140 may access data provided by the server 72 of the SEEP 70 to acquire dimensions, etc., of solar energy equipment that may be installable to the structure 20. The PPS server 140 may employ the calculated insolation of each face of the roof, the solar energy equipment dimensions, information of the features of the site 40 (in particular, of features such as the chimney 44 and the vents 46, 48) to design a solar energy system and installation thereof for the roof 30 of the structure 20. The PPS server 140 may access data of the server 62 of the EGS 60, the data comprising or enabling derivation of actual or estimated cost of power from the EGS 60 to the structure 20. The PPS server 140 may further provide time-value-of-money calculations (or other cost-benefit analyses) illustrating an investment cost to install a solar energy system to the structure 20, maintenance costs, energy cost savings over time, property value impact, etc. The PPS server 140 may format the relevant data to generate a proposal providing detailed information regarding a proposed installation of solar energy equipment to the structure 20. The PPS server 140 may provide a digital interactive proposal over a communication network to a client computing device such as the tablet computer 150.

The tablet computer 150 may be used to provide general and particularized solar energy information (Solo™ Preposal™) to the owner and/or a detailed solar energy proposal. The Preposal™ may comprise general information of an educational nature, along with a placeholder for a particularized proposal for the structure 20 and/or site 40. While the educational material is presented, the proposal is generated by the PPS server 140 and delivered and may be integrated with or otherwise combined with the Preposal™ for presentation to the owner. The Preposal™ may seamlessly transition from general educational material about solar energy to the particularized proposal for the structure 20 and/or site 40. Stated otherwise, the platform provided by the PPS 100 may provide for presenting both the Preposal™ and the proposal in a seamless manner, in one integrated presentation.

The proposal may provide information regarding proposed solar energy equipment to install to the structure 20 and/or at the site 40, such as, e.g., a particular solar panel arrangement for one or more faces of the roof 30; expected solar energy production output for time frames ranging from hourly to annually and lifetime, etc. The proposal may include an interactive digital representation 120 of the structure 20, and one or more panels 130 (or other interfaces) to display relevant information. The proposal may provide further information to assist in closing of a sale to acquire and install the solar energy equipment to the structure 20 (as a solar energy system), such as, e.g., identification of candidate equipment, installation details (disposition of solar panels and other equipment), etc. The platform provided by the PPS 100 may further enable acquiring (ordering) the needed solar energy equipment, assisting with permitting (if required), contracting an installer, providing for inspection and connection to the EGS 60 (for net metering or power sell-back, where enabled), etc. More particularly, the PPS 100 (e.g., via the tablet computer 150) may be configured to accept an order from the owner and/or sales rep, to order the solar energy equipment, to schedule inspections, installation, and connections, and may process payments related to implementing the installation. In other words, the platform provided by the PPS 100 in conjunction with the tablet computer 150 and a seamless presentation of the Preposal™ and proposal, may function to support a single-point-single-contact sale of solar energy equipment, making for an informed sale and an organized, efficient installation.

Figure 2A:
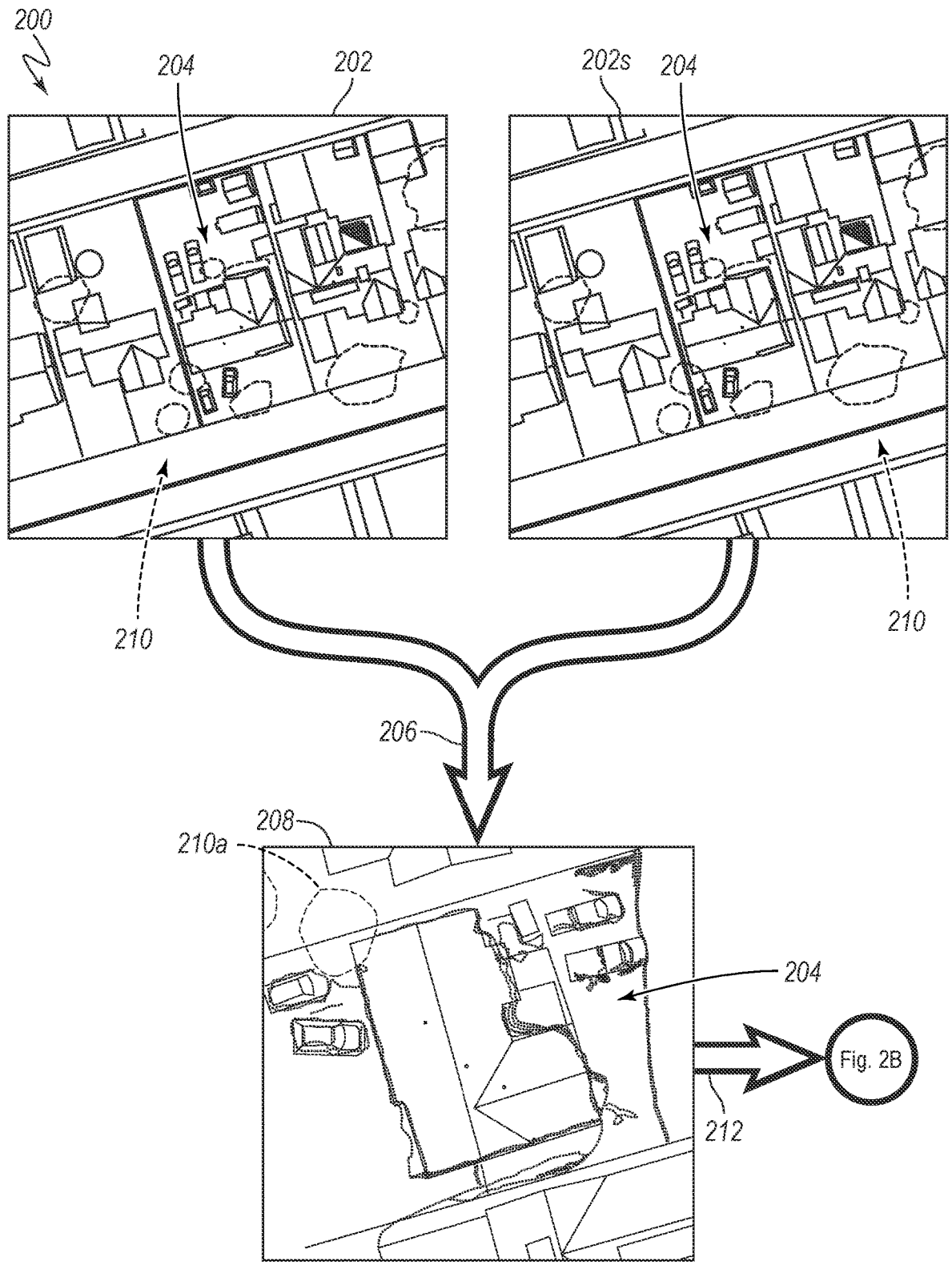
FIGS. 2A-2H and 2J-2M are a diagram of a process of a PPS to generate and present an electronic interactive solar proposal ("proposal") for a solar energy system, according to one embodiment of the present disclosure.

FIGS. 2A-2H and 2J-2M are a diagram a process of a project proposal system (PPS) 200 to generate and present an electronic interactive solar proposal ("proposal") for a solar energy system, according to one embodiment of the present disclosure. The PPS 200 may be similar in some respects to the PPS 100 of FIG. 1. In FIG. 2A, the PPS 200 may receive stereoscopic imagery for the site. The PPS 200 may, additionally or alternatively, receive or generate an orthogonal composite image (see the orthogonal composite image 214 in FIG. 2B). An orthogonal image can be a digital aerial image of land produced using digital orthoimagery. An overhead image may be captured as a first stereoscopic image 202 of a site 204 that may, as shown, include a structure, to which the owner of a site 204 may wish to consider installing a solar energy system. Another overhead image may be captured as a second stereoscopic image 202s of the site 204. The PPS 200 generates (or receives) point cloud data for the site (or a definable space at a location). By way of non-limiting example, the PPS 200 may access or otherwise receive point cloud data for a site of a potential solar electrical generation system. The first stereoscopic image 202 and a second stereoscopic image 202s and/or point cloud data may be processed 206 to generate a point cloud 208 for the site 204.

The point cloud 208 may be generated from a high confidence disparity map of common points within the two stereoscopic images, with each common point having a position relative to an arbitrary point near the center of the point cloud 208. The point cloud 208 may be logically disposed within a global coordinate system whereby a user may rotate the point cloud 208 in three axes The stereoscopic images 202, 202s may include amorphous entities 210. An amorphous entity 210 may be an image artifact representing an object which lacks a fixed size, shape, volume, density, or other feature, such as a tree, a shrub, a flag, a banner, a temporarily placed object, etc. In other words, an amorphous entity may have substantially different representation in images taken at different times of a given day, on different days, at different seasons of the year, in different years, affected by weather (in particular, by wind, for example), etc. An amorphous entity 210a, representing a tree, is identified for reference (hereafter, "tree 210a").

In some embodiments, the image data may be high quality and/or precisely positioned and/or point cloud 208 generation from such image data may be quite accurate. In some embodiments the generated point cloud 208 may include substantial noise. Noise, or other error in the point cloud data may come from, among other things, the relatively small values produced by the disparity map and the large distances over which the disparities are calculated or a lack of distinct features or texture on matching areas of the stereo image. Noisy point cloud 208 data points can be low pass filtered and a dense point cloud can be produced representing at least the upper surfaces present in both stereoscopic images 202, 202s. Some of the algorithms used to process the point cloud 208 and identify salient structures of the environment include: K-Nearest Neighbors, K-Means Clustering, GMM (Gaussian Mixture Models), RANSAC (Random Sample Consensus), PCA (Primary Component Analysis), Histogram Binning, MLESAC (Maximum Likelihood Estimate Sample Consensus), Least Squares Multiple Regression, and/or combinations of the same.

Figure 2B:
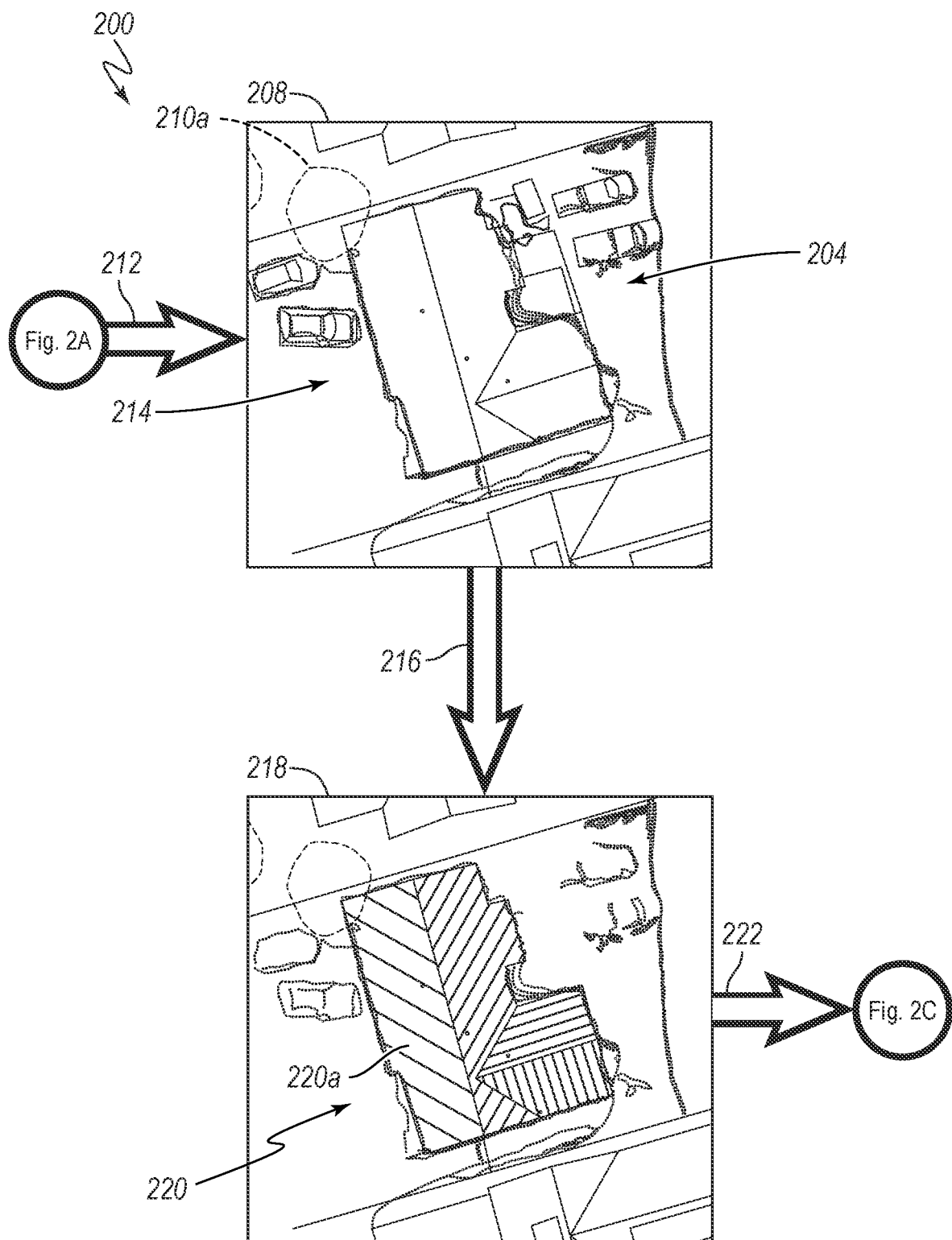

In FIG. 2B, an orthogonal composite image 214 may be generated 212 from a flattened version of the point cloud 208. The tree 210a is identified for reference. The dense point cloud 208 is further processed 216 to identify clusters or arrays of points in the point cloud 208 that relate to roof surfaces 220, whereby points relating to non-roof surfaces of the site (e.g., the ground, trees, adjacent structures, etc.) can be filtered out. In one embodiment, a flattened version of the point cloud data is then fed to a neural network that has been trained to identify the vertices and edges of the roof planes on the building. These vertices and edges are then joined to become the polygons that represent the roof surfaces. The point clusters identified to the roof surfaces 220 are further refined to identify rough polygons (or other shapes) representing outlines of each face comprising the roof surface. A first roof surface 220a is identified for reference. In FIG. 2B, each identified roof surface 220 is illustrated with a different cross hatch. Each rough polygon may comprise a side which abuts a side of another rough polygon (such as, e.g., at a peak, a valley, a hip, etc.) or an edge of the roof. The point clusters and rough polygons are processed to refine the shape of each polygon to generate an azimuth and pitch segmentation map 218 of the roof surfaces wherein the roof is contiguous (e.g., noise in the point clouds resulting in breaks between adjoining sides of polygons is resolved). The azimuth and pitch segmentation map 218 is further processed 222, as discussed in conjunction with FIG. 2C.

Figure 2C:
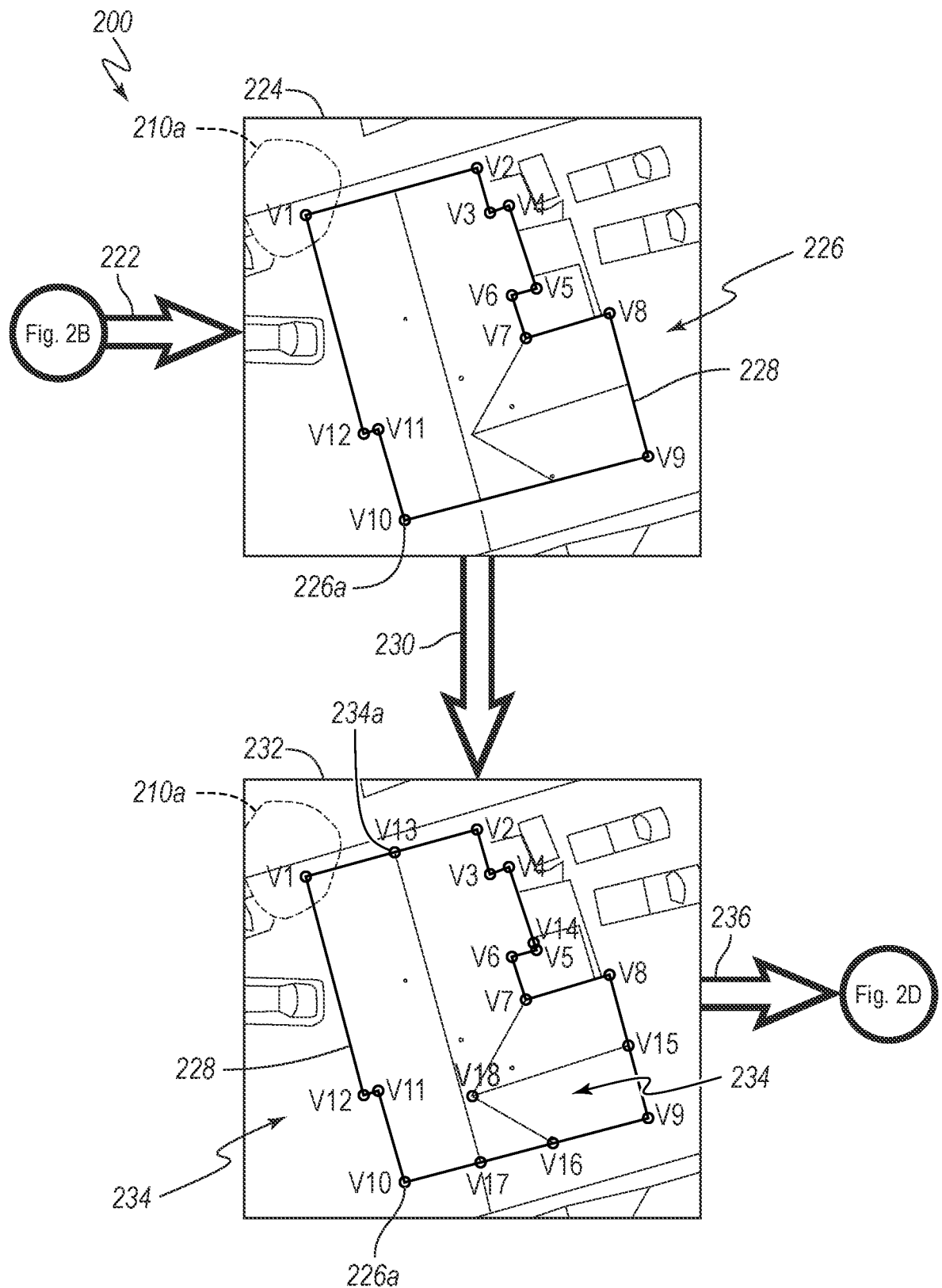

In FIG. 2C, further processing 222 is directed toward detection 224 of an original footprint 228 of the structure. The tree 210a is identified for reference. An original footprint may be described as a perimeter of a real-world feature which resulted in the particular point cloud (or portion of the point cloud). In other words, the original footprint is the perimeter of the real-world object represented by at least a portion of the point cloud. A vertex detection neural network ("VDN") (see the VDN 545 in FIG. 5) may be employed to detect a first set of vertices (V1-V12) 226, wherein the first set of vertices 226 is generally disposed about a perimeter of a structure (e.g., an entire roof). Said otherwise, the PPS 200 may identify perimeter points (e.g., vertices 226) of one or more surfaces of interest of an object of interest. In one embodiment, the PPS 200 may identify perimeter points (e.g. vertices 226) of one or more limits of a definable space at a location. One vertex (V10) 226a is identified for reference. A member of the first set of vertices 226 is identified for reference. In one embodiment, a vertex may be a point (actual or theoretical) where three planes intersect as suggested by the normal directions of neighboring groups of points. In another embodiment, a vertex may be a point cloud point or feature where an array of next-neighbor points indicates an intersection of at least three planes wherein at least two planes are perimeter defining for the structure. In one embodiment, a vertex may be a point cloud point or feature where a plane of point clouds has a single point (or nuclear array of points) situated at a nexus of a region of points (present points) and a region absent of points (absent points) (a region of the plane of points free or substantially free of points) wherein the region of present points occupies less than a 180° contiguous arc and the region of absent points occupies greater than a 180° arc. The VDN may iteratively operate 230 to detect 232 additional vertices (V13-V18) 234 that may be located about a top surface or a portion of the structure (e.g., a roof face). One such vertex (V13) 234a is identified for reference. A member of the additional vertices 334 represents a point cloud feature where an array of next-neighbor points indicates an intersection of at least three planes wherein at least two planes are not perimeter defining for the structure. The PPS 200 then generates 236 an edges map 238, as discussed in conjunction with FIG. 2D.

Figure 2D:
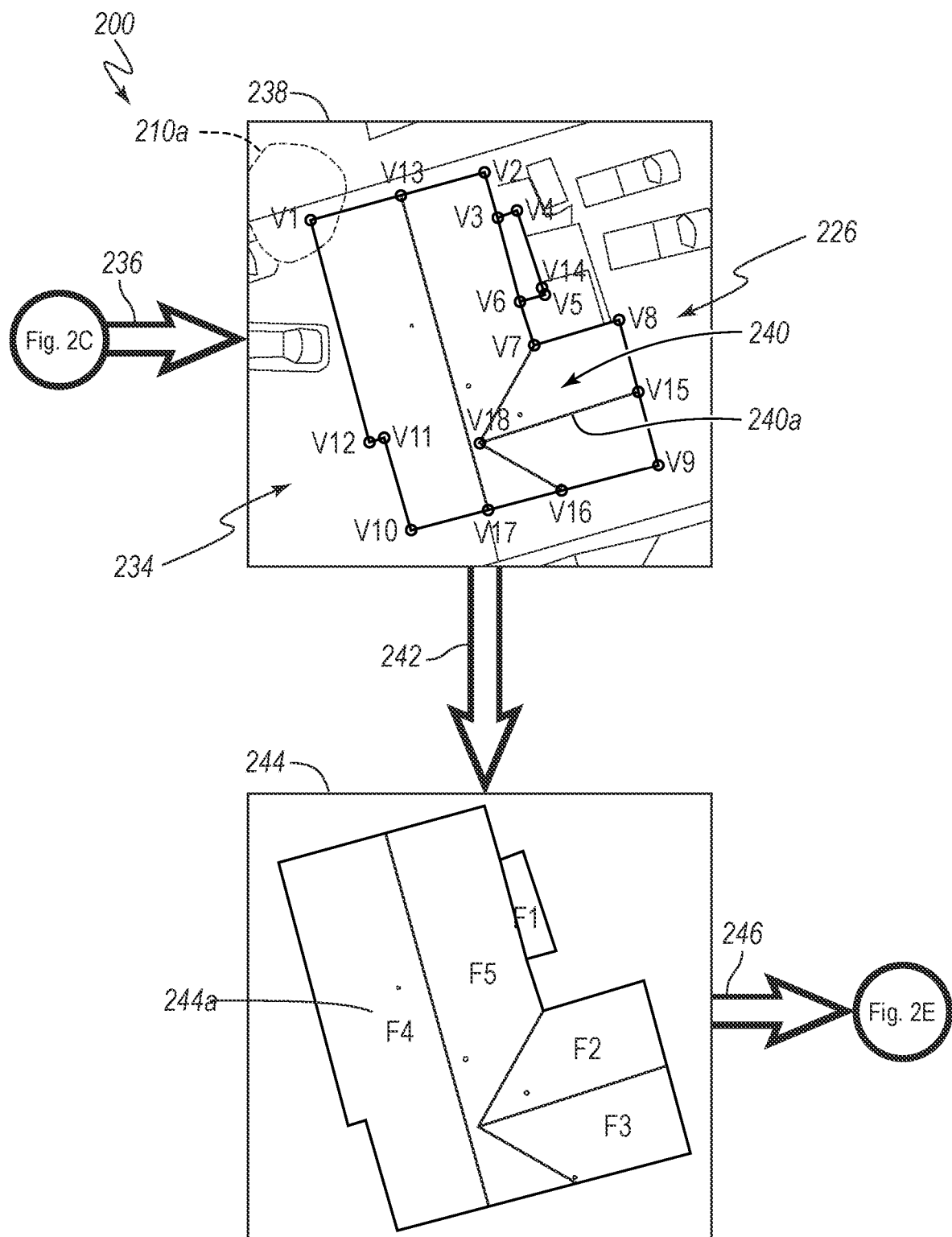

In FIG. 2D, the PPS 200 generates 236 an edges map 238. The tree 210a in the point cloud is identified for reference. An edge detection neural network ("EDN") (see the edge detection neural network 550 in FIG. 5) constructs bounding boxes, each circumscribing an array of next-point neighbors that represent an intersection between two planes within the point cloud, and also containing two vertices 226, 234. The EDN may be an embodiment of a perimeter neural network that detects a perimeter of a surface of interest. In one embodiment, the PPS 200 algorithmically places a set of perimeter points (e.g., the vertices 226) inside a bounding shape and connects the perimeter points within each bounding shape to find a perimeter of a definable area at a location. A line defining an edge is algorithmically established between the two vertices 226, 234 along the intersection of the two planes. These lines represent edges 240 between vertices 226, 234. Stated otherwise, the PPS 200 identifies surface of interest edge types, such as edges defined or found at a roof ridge, eaves, hips, and valleys. One such edge 240a (a roof ridge) is identified for reference. The PPS 200 processes 242 the edges 240 to detect roof faces 244. The PPS 200 may employ a face detection engine ("FDE") (see the face detection engine 555 in FIG. 5) to relate the edges 240 so as to construct digital (or electronic) representations of roof surfaces (F1-F5) 244. In one embodiment, the FDE uses a Cycle Basis algorithm to detect the roof faces 244. One such roof face (F4) 244a is identified for reference. Further processing 246 is discussed in conjunction with FIG. 2E. At this stage, the roof faces 244 exist in a single plane.

In one embodiment, the PPS 200 may generate a representation of each surface of interest (e.g., a roof face, a patio, a water feature) of the one or more surfaces of interest, based on corresponding perimeter points (vertices 226, 234), perimeter, 2D face and 3D plane, and may join the representation of the one or more surfaces of interest to create a 3D model of at least a portion of an object (e.g., a structure, a geographic feature) of interest. In one embodiment, finding a perimeter of a definable space at the location may comprise determining a 2D face of one or more top surfaces, which may enable or assist the PPS 200 to generate a model of the definable space at the location.

Figure 2E:
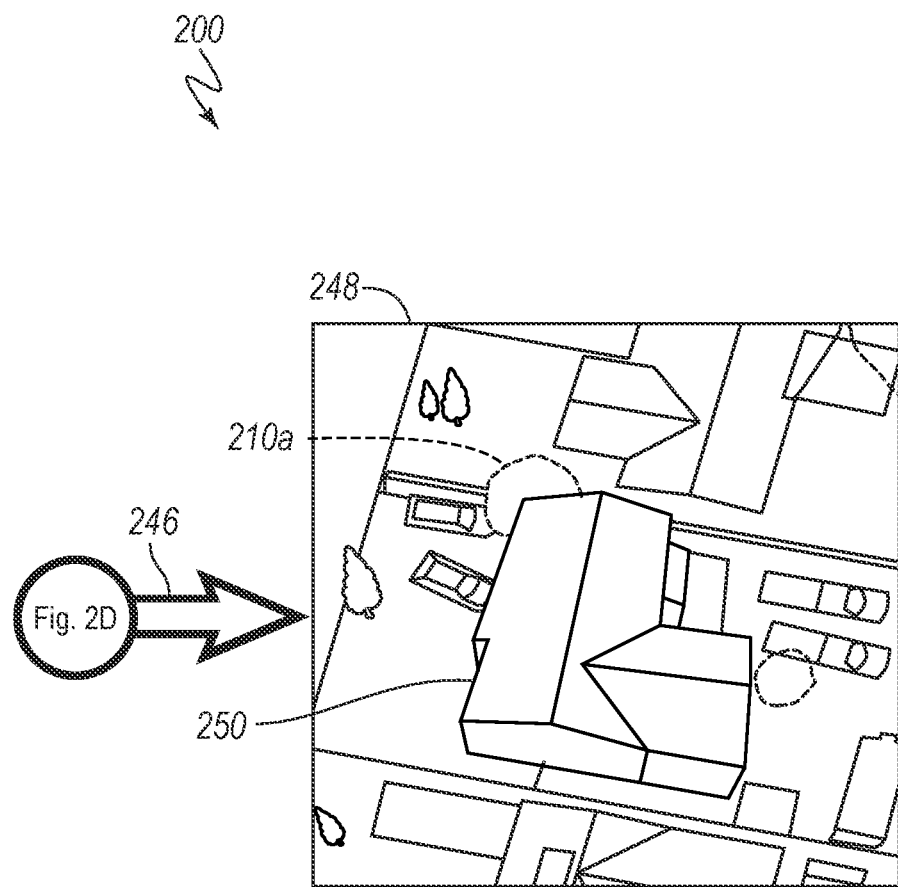

In FIG. 2E, the further processing 246 is directed to modeling the point cloud data to generate a structure representation (e.g., a 3D model, a polyhedron model) (hereafter, "3D model") 250 of the structure at the site through 3D planes detection 248. In one embodiment, the PPS 200 models the point cloud data to generate a representation of an object of interest at the site, including one or more surfaces of interest for the project to be proposed. In one embodiment, the PPS 200 models the point cloud data to generate a representation of a definable space at a location. The structure representation 250, in the present example, comprises one or more roof faces. The tree 210a is identified for reference. The PPS 200 may employ a 3D planes detection engine ("3DE") (see the 3D planes detection engine 560 in FIG. 5) to transform the individual roof faces 244 into their respective 3D planes. The 3DE maps planar (x, y) coordinates (2D vertex locations) from the orthogonal composite image to planar (x, y) coordinates with the point cloud for the structure (see the orthogonal composite image 214 and the point cloud 208 in FIG. 2B). This allows the 3DE to associate a collection of point cloud points to each defined roof surface at the single plane, then to employ the additional data (e.g., a z-coordinate or elevation component) of each point associated to the particular 2D roof surface in order to establish the 3D roof plane. The 3DE can use random sample consensus ("RANSAC") to establish a 3D plane that is a "best fit" for the points associated to the particular 2D roof plane. The collection of 3D roof planes can be joined together to construct the representation 250 of the structure, such as a simplified 3D model of the roof of the structure. The representation 250 of the structure can be completed by adding a representation of each vertical wall extending from a roof face of the one or more roof faces to a ground plane. A 3D model, or modeling, provides a digital representation of an object (in the present example, a structure) in the physical world, along with digital representation of at least some physical features (shape, form, etc.) of the object. The structure representation 250 is used in simulations, as discussed below. A simulation, by contrast to a model, involves a translation (a motion or movement) of a digital representation of a physical thing. By way of example, movement of the sun relative to the 3D model 250 will be simulated.

Figure 2F:
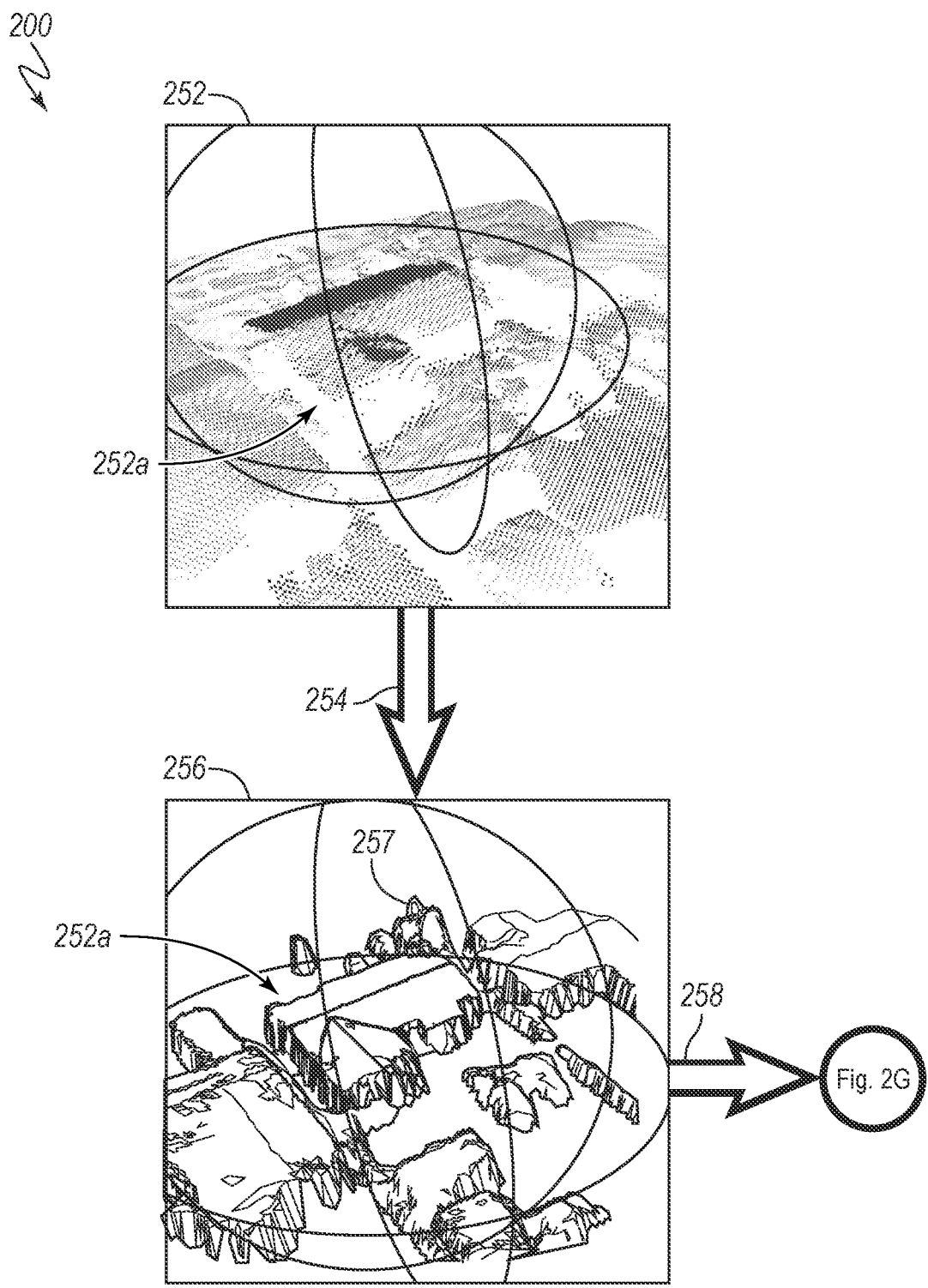

In FIG. 2F, a wide area point cloud 252 is shown, including the site of the structure and at least minimal surrounding area (see the site 204 in FIG. 2A). The relative point density throughout the point cloud indicates various physical entities represented in the wide area point cloud 252. The roof structure 252a is identified for reference. The point cloud data may be modeled to generate a site representation (e.g., in the form of a 3D mesh scene). The wide area point cloud 252 may be rendered in a global coordinate system whereby a user may rotate the wide area point cloud 252 in three axes. The wide area point cloud 252 can be processed to generate 254 a mesh scene 256 containing the roof structure 252a and obstructions. In one embodiment, the PPS 200 models the point cloud data to generate a site representation (e.g., a 3D mesh) of the site that includes an object of interest and one or more objects adjacent to or otherwise around the object of interest. In one embodiment, the PPS 200 generates a visual representation, such as the 3D mesh, of an object of interest and any obstruction(s) that can be utilized to determine or otherwise indicate a shade metric of each point of the one or more surfaces of interest. In one embodiment, the PPS 200 models the point cloud data to generate a 3D mesh as a site representation of a definable space at a location. The 3D mesh can be a collection of vertices interconnected with edges to define polygons that form a model of an object. The 3D mesh may include one or more surfaces of interest and one or more objects at the site that are adjacent to or around the one or more surfaces of interest. By way of non-limiting example, adjacent points (or next-neighbor points) may be grouped to form a collection of Delaunay triangles. In other words, wide points are collected and formed into Delaunay triangles, then a ray casting scene is created and the triangles inserted. The mesh is imposed on the scene by the nature of each triangle side being shared with exactly one other triangle. One obstruction 257 is identified. The obstruction 257 is an analog of the tree (see the tree 210*a* in FIGS. 2A-2E). The mesh scene 256 is used to generate 258 an insolation potential map (see the insolation potential map in FIG. 2G).

Figure 2G:
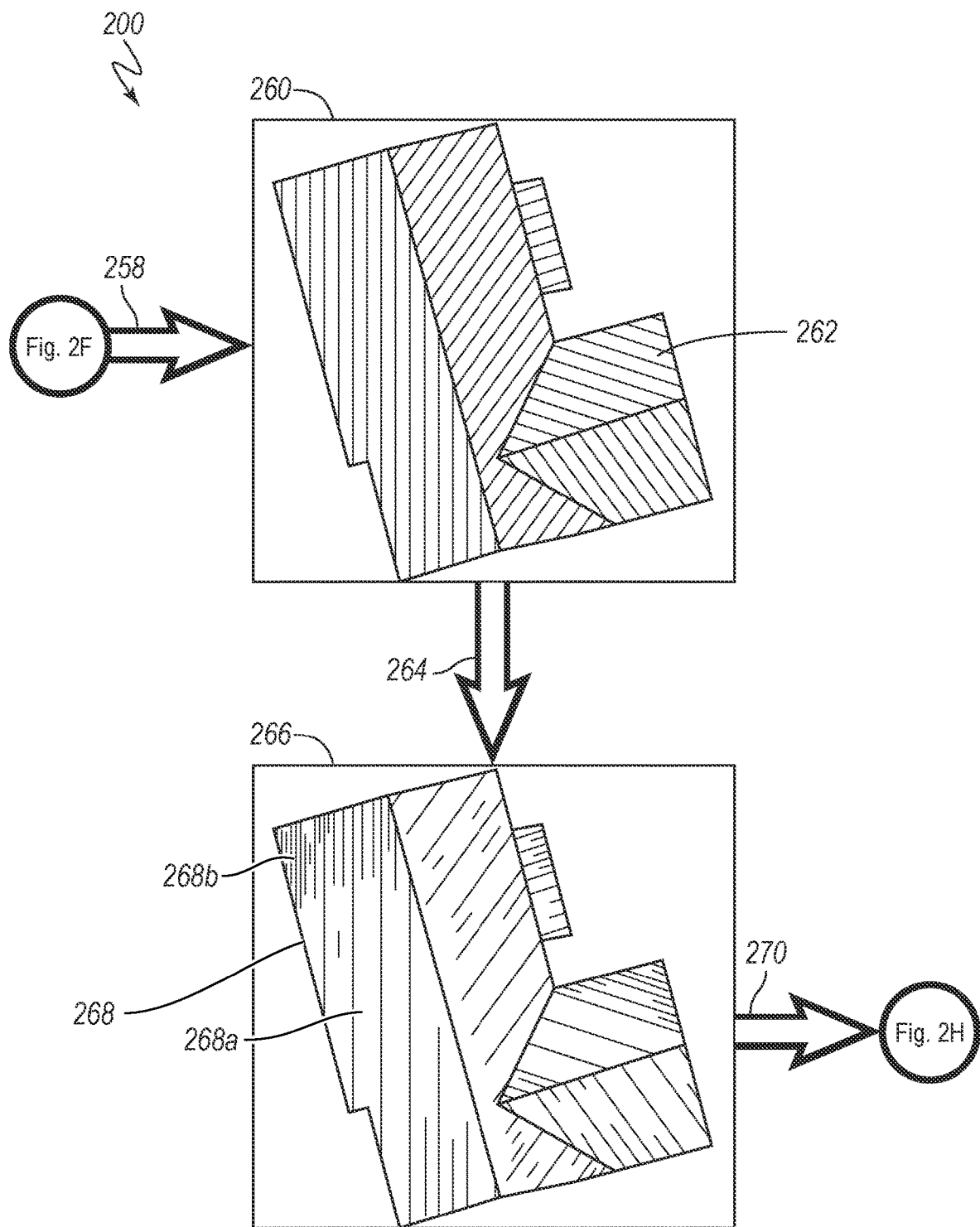

In FIG. 2G, an insolation potential map 260 is generated 258. The PPS 200 may employ a simulation engine ("SIM") (see the simulation engine 565 in FIG. 5) to simulate sunlight striking each roof plane free from any obstruction (shade casting entity). The SIM may simulate a path of the sun with respect to the structure representation 250 (from FIG. 2E) to identify areas of the roof surfaces that are shaded from the sun at any time due to an obstruction. This simulation may be run recursively based on a solar maximum day, a solar minimum day, a period of days, etc. The SIM may run the sun path simulation for any given point of time and/or span of time. The SIM may simulate a path of the sun with respect to a site representation of the site or definable space at a location to identify areas of an object of interest that are shaded from the sun by an object adjacent to the object of interest and that obstructs the sunlight from a surface of the object of interest. The SIM may gather or otherwise obtain sun positions (zenith and azimuth) for a plurality of points in time or time spans that represent phases (e.g., days, weeks, months, seasons, etc.) throughout (e.g., every second, every minute, every hour of) the year for the geolocation of the site. The PPS 200 then calculates potential insolation of each 3d roof plane free of any obstruction (shade casting entity) to produce the insolation potential map 260. Insolation potential of each 3D roof plane is represented by a different cross hatch 262.

The wide area point cloud or the mesh scene, or both may be utilized to generate a less dense point cloud (obstruction point cloud) representing features previously filtered out, such as trees, adjacent structures, etc., that may affect insolation of the roof of the structure (see the wide area point cloud 252 in FIG. 2F). The obstruction point cloud is processed to generate a point cloud with insolation that includes shade from surrounding obstructions and insolation heat-mapped to the roof of the structure.

The SIM may iterate through the sun path simulation, filtering the sun positions for a plurality of points in time to daytime sun positions, and further filtering to sun positions for multiple days of year representative of, e.g., summer and winter solstice (or solar maximum and solar minimum days). The SIM simulates the sun positions for the multiple days of the year to find shade on the one or more roof surfaces. Stated otherwise, the SIM runs the sun path simulation to represent the sun positions for the multiple days (or time points) of the year to simulate shade at any given point of the point cloud representing any portion of a roof surface. By way of non-limiting example, the SIM represents the sun positions for the multiple days of the year to simulate shade at a point per period (e.g., hour) of the year, on one or more roof surfaces. The point cloud with insolation can be further processed (possibly with the azimuth and pitch segmentation map 218 (from FIG. 2B) and/or the azimuth map 284 (of FIG. 2K)) to generate 264 a roof insolation map 266. Said otherwise, the PPS 200 generates a visual representation (the roof insolation map 266) of the roof surfaces that indicates the insolation (e.g., irradiance, irradiation, total solar resource fraction (TSRF), solar access) value of each of the roof surfaces. Processing to produce the roof insolation map 266 comprises relating the path of the sun relative to the site or the building (zenith and azimuth), in particular, at the solar maximum day and the solar minimum day to generate a sun path simulation. The sun path simulation provides a representation of the sun rays from the sun's point of view to a site. In one embodiment, an Euler transformation can be used to project theoretical sunlight from the sun's point-of-view. In another embodiment, a process of Ray Casting on Mesh can be utilized to project theoretical (or simulated) sunlight from the sun's point-of-view to the site. When applied to the obstruction point cloud, the azimuth and pitch segmentation map 218, and the azimuth map 284, the sun path simulations for the solar maximum day and the solar minimum day produce hourly irradiation data points that are then used to annualize the insolation of the roof surfaces (e.g., estimate or otherwise calculate insolation throughout a year). The roof insolation map 266 can represent annual irradiation of the roof.

One useful way of determining insolation is to measure or calculate yearly irradiance (and the present disclosure anticipates other ways). The following data values for calculating yearly irradiance for each point on the roof can be gathered by at least either of the two following options.

Option 1. Determine one or more insolation values for each face (e.g., point, area, square unit, entire face, etc.) of the one or more faces of the structure for a time period (e.g., a single point in time, a span of time), considering areas of the one or more faces that may be shaded at one or more times within the time period. This can be accomplished by: masking (e.g., extracting, filtering, separating, etc.) face points of the point cloud (e.g., based on the one or more faces, or based on determining the points of the point cloud that are on the one or more faces); determining a (theoretical) maximum available irradiance (insolation) at each; determining a shade metric or value at each point of each face of the one or more faces for the time period; and determining the one or more insolation values based on the theoretical maximum available irradiance (or insolation) and shade metric at each point of each face of the one or more faces for the time period.

Option 2. Determining an insolation value for each face of the one or more faces of the structure for a period of time (e.g., a single point in time, a span of time), considering areas of the one or more faces that are shaded at one or more times within the time period. This can be accomplished by: separating (e.g., extracting, filtering, masking) surface points of the point cloud for the given face from other points of the point cloud; determining a theoretical maximum available irradiance (or insolation) at each point of the points of the given face over the time period, determining a shaded irradiance (insolation) at each point of the given face, the shaded irradiance (insolation) based on the theoretical maximum available irradiance (insolation) and the shade value or metric at each point of the given face over the time period; and summing the shaded irradiances (insolation) of all the points of the given face.

Either Option 1 or Option 2 may provide for determining a shade metric or value, which may be determined at each point of the one or more surfaces of interest for a time period; and/or identifying the objects at the site that are obstructions, based on the shade metric at each point of each of the one or more surfaces of interest.

An annualized degree of shade map 268 represents the calculated effect of shade cast upon areas of the roof. A region of less-dense cross hatch 268a represents a lesser degree of shade (a higher degree of insolation), while a region of more-dense cross hatch 268b represents a higher degree of shade (a lower degree of insolation) on an annual basis. It should be noted that the PPS 200 may be configured to adjust the roof insolation map 266 to a particular period, such as, e.g., seasonal rather than annual. It should also be noted that insolation values for a roof may be calculated in various ways. In one embodiment, the PPS 200 calculates an insolation value for each point of the point cloud associated with a particular roof face. In one embodiment, the PPS 200 may calculate an insolation value based on an array of points of the point cloud, such as a definable measurable area (e.g., a square foot, a square meter, etc.) of a roof face, a definable fraction of a roof face (e.g., one-tenth, one-quarter, etc.), an entire roof face, or the entire roof.

Figure 2H:
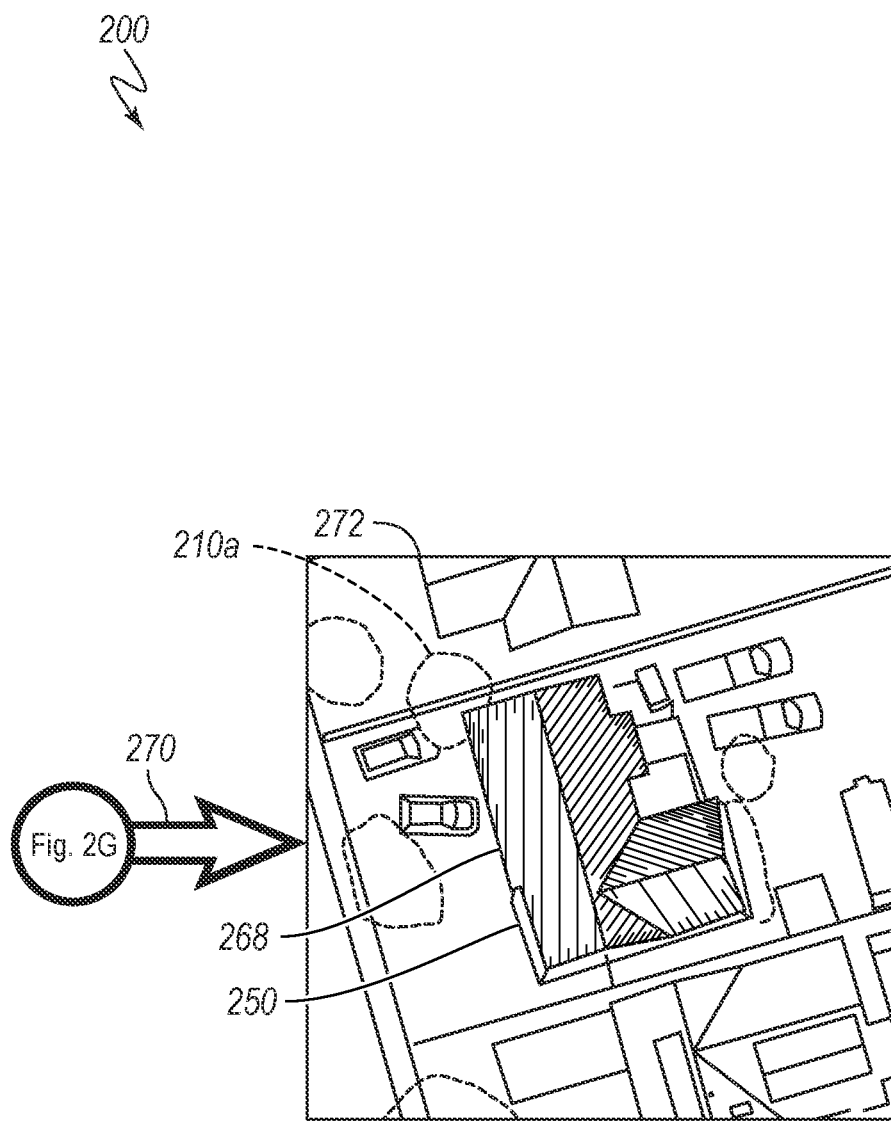

The roof insolation map 266 is further processed to generate 270, in FIG. 2H, a filtered production estimate map 272. The tree 210a is identified for reference. The filtered production estimate map 272 considers the roof irradiation map 268 and the model 250 to estimate a potential for solar energy production across the roof. Cross hatch density indicates relative production estimate across the roof with less-dense cross hatch indicating higher production estimates (less shade), and more dense cross hatch indicating lower production estimates (more shade).

The designation of "FIG. 2I" is not used for any drawing to avoid confusion.

Figure 2J:
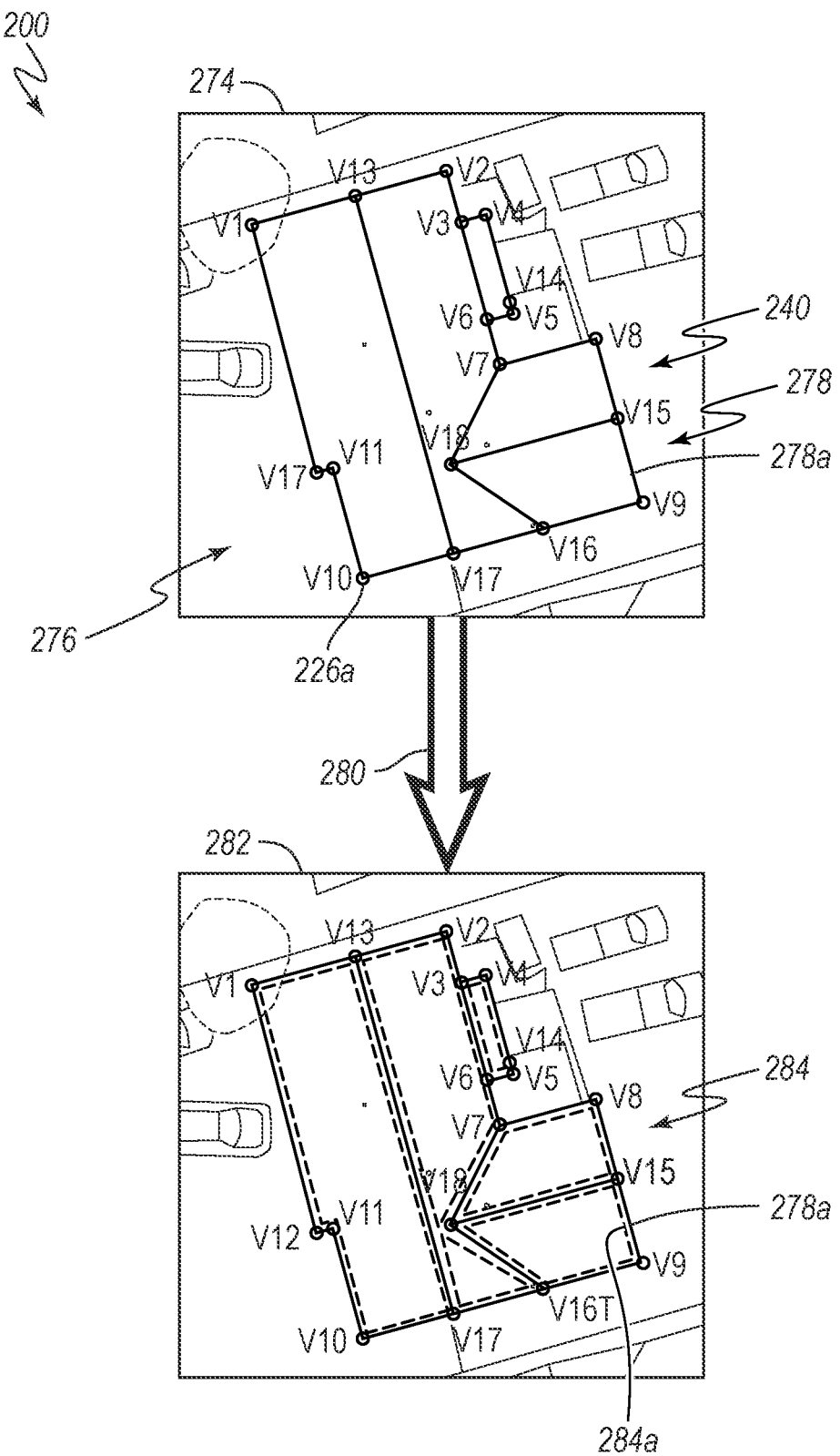

In FIG. 2J, the edges 240 (from FIG. 2D) are classified 274. The vertices 226, 234 and the edges 240 have been previously identified (see FIGS. 2C and 2D). In one embodiment, the vertices 226, 234 and/or edges 240 may be reidentified or re-located again, as by a reiteration of the operations of FIGS. 2C and 2D, or another operation. The vertex (V10) 226a is identified for reference. The edges 240 are initially classified as actual edges 278. One actual edge 278a is identified for reference. The PPS 200 generates 280 an edge erosion map 282. The edge erosion map 282 may consider local, state, or other regulatory requirements, such as fire codes, building codes, etc. For convenience of the disclosure, fire offsets 284 are referenced, however, any other requirement may be imposed. The fire offsets 284 impose a set back from a physical edge of a roof for the installation of at least some equipment, such as solar panels. A fire offset 284a is identified adjacent to its corresponding physical edge 276a. The PPS 200 generates 280 the edge erosion map 282 to identify roof areas available for use in the proposal in view of the fire offsets 284 (or other offset requirement). Determining roof areas available for use in the proposal entails determining dimensions (or measurements) of each of the one or more roof faces, adjusting for the fire offsets 284, and obstacles (see the obstacles map 288 in FIG. 2L); and may further consider dimensions and other requirements for equipment to be installed.

Figure 2K:
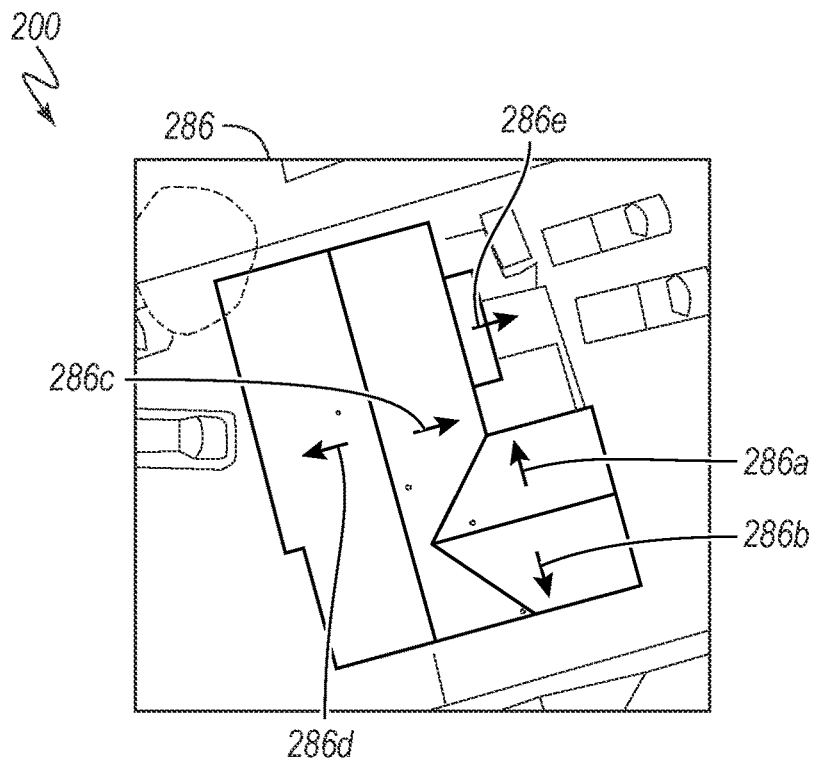

In FIG. 2K, the PPS 200 generates an azimuth map 286. The azimuth map 286 may provide an azimuth for each roof face or other surface of interest. An azimuth in the azimuth map 286 indicates a direction of orientation of a roof face or other surface (without regard for inclination from horizontal). An azimuth is a compass-relative (cardinal) orientation. To illustrate, a structure may have a surface of interest comprising two faces, wherein the first face has an azimuth of 95° and the second face has an azimuth of 275° (i.e., 180° relative to the first face). In other words, the structure may have a general north-south longitudinal disposition with a general east-west orientation of the two faces of the surface of interest, and the two faces of interest are disposed in nearly opposite directions. In FIG. 2K, five azimuths 286a-286e are identified—one for each roof face. Each azimuth 286a-286e may indicate an orientation of an associated roof face relative to an adjoining roof face. Said otherwise, the azimuth 286a may represent an orientation of its associated roof face relative to an adjacent roof face having the azimuth 286b, and, conversely, the azimuth 286b represents the orientation of its associated roof face relative to the roof face having the azimuth 286a.

Figure 2L:
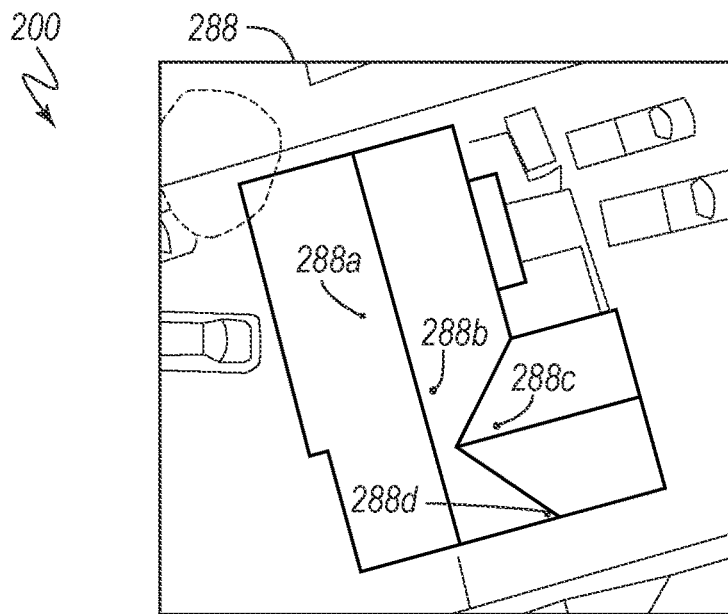

In FIG. 2L, the PPS 200 generates an obstacles 288 map. The PPS 200 detects placement obstacles, e.g., protrusions, penetration (such as vents, fans, etc.) on the one or more roof faces of the structure using at least the overhead imagery. The orthogonal composite image 214 (of FIG. 2B), or one or both of the stereoscopic images 202 (of FIG. 2A) can be used to identify obstacles 288a-288d to the installation of solar equipment on the roof of the structure, including features of the structure, such as penetrations (e.g., chimneys, vents, etc.), HVAC equipment, antennae, etc. Machine learning algorithms can be utilized to identify the obstacles 288a-288d from the image(s) 202, 214. For example, training images can be used to develop and/or train one or more neural networks that can be used to process the image(s) 202, 214 to identify the obstacles 288a-288d. In the present example, the obstacles 288a-288d impose limitations on the placement of solar panels on roof faces. In FIG. 2L, four obstacles 288a-288d are identified. By way of non-limiting examples, the obstacles 288a, 288b, and 288c may be penetrations, such as vents, fans, etc., and the obstacle 288d may be an electrical service drop. In another embodiment having an application other than that of a solar power system, the obstacles 288a-288d may represent any feature that affects the completion of the intended project.

Figure 2M:
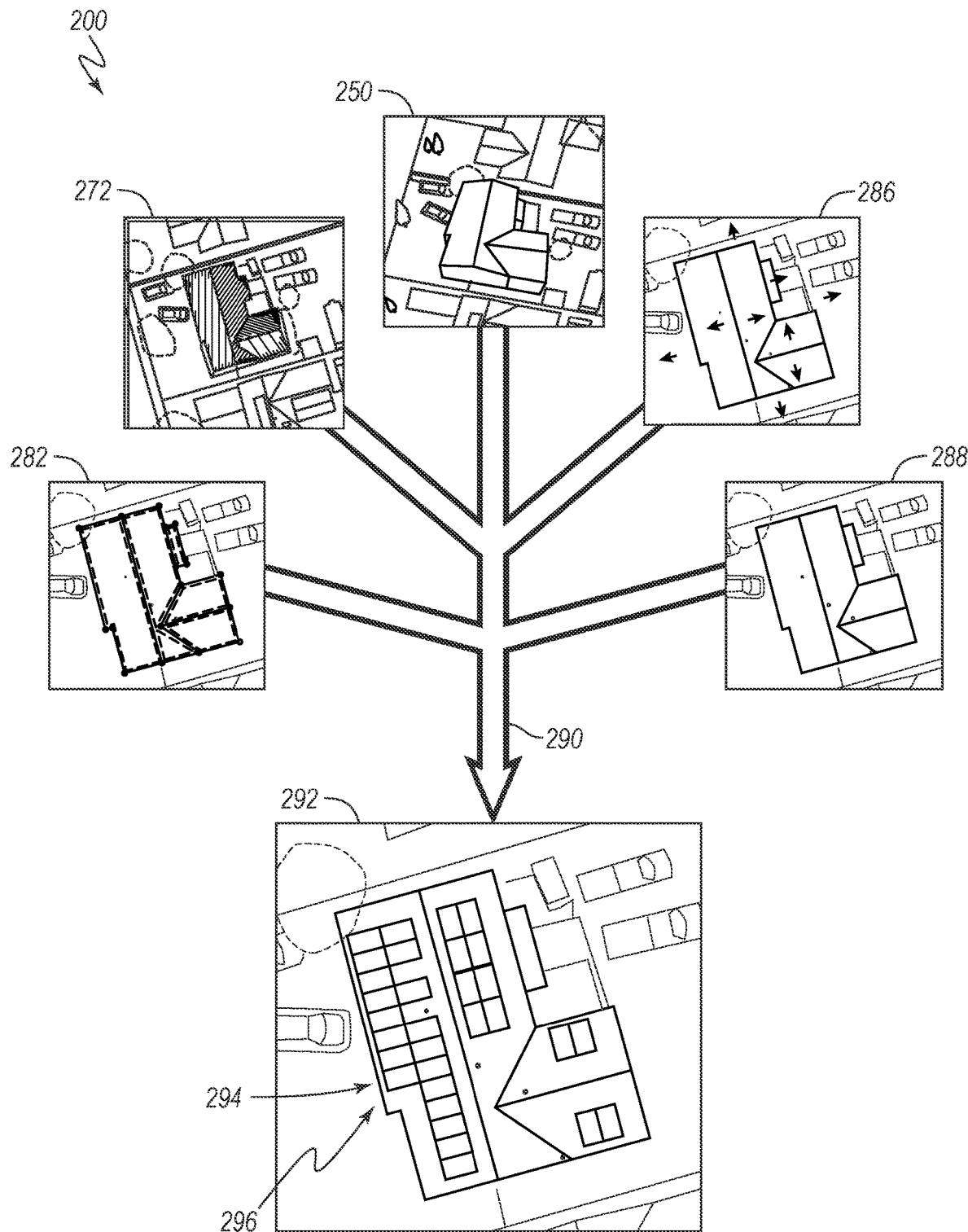

In FIG. 2M, the PPS 200 processes together 290 the 3D model 250, the filtered production estimate map 272, the edge erosion map 282, the azimuth map 286, and the obstacles map 288, along with the data regarding solar energy equipment (e.g., dimensions, installation clearances and requirements, etc.) to produce a candidate map 292 for installation of solar energy equipment to the roof of the structure. In one embodiment, the PPS 200 determines proposed positioning (a candidate map 292) of one or more elements of a proposed project, based on dimensions of the one or more surfaces of interest. The candidate map considers various installation geometries for solar panels 294 to determine an optimal installation geometry 296 for the particular structure. Each candidate map 292 involves determining (or optimizing) proposed placement (e.g., location, positioning, orientation, inclination) of one or more solar panels of the potential solar electrical generation system on the one or more roof faces based on: the insolation values, the dimensions of the one or more roof faces, the placement obstacles on the one or more roof faces, and any AHJ requirements such as fire setbacks or other offsets.

The candidate map 292 may be utilized to generate a digital interactive proposal to present the proposed placement of the one or more solar panels, such as for customer information and understanding. The candidate map 292 can be added to a structure representation and/or site representation (e.g., a model), which can be rendered to provide visualization of the placement of the solar panels. A visualization of the site representation can be achieved via taking labeled (labeled as belonging to the roof, or the vertical walls) three-dimensional (3D) vertices (or coordinates) and using an earcut (or ear clipping) polygon triangulation algorithm to generate the geometry for displaying the mesh of the house. In another embodiment, the candidate map 292 can be modeled to generate a representation (e.g., 3D model) to be rendered in or in conjunction with the digital interactive proposal. The digital interactive proposal can be provided over a communication network to a client computing device.

Figure 3:
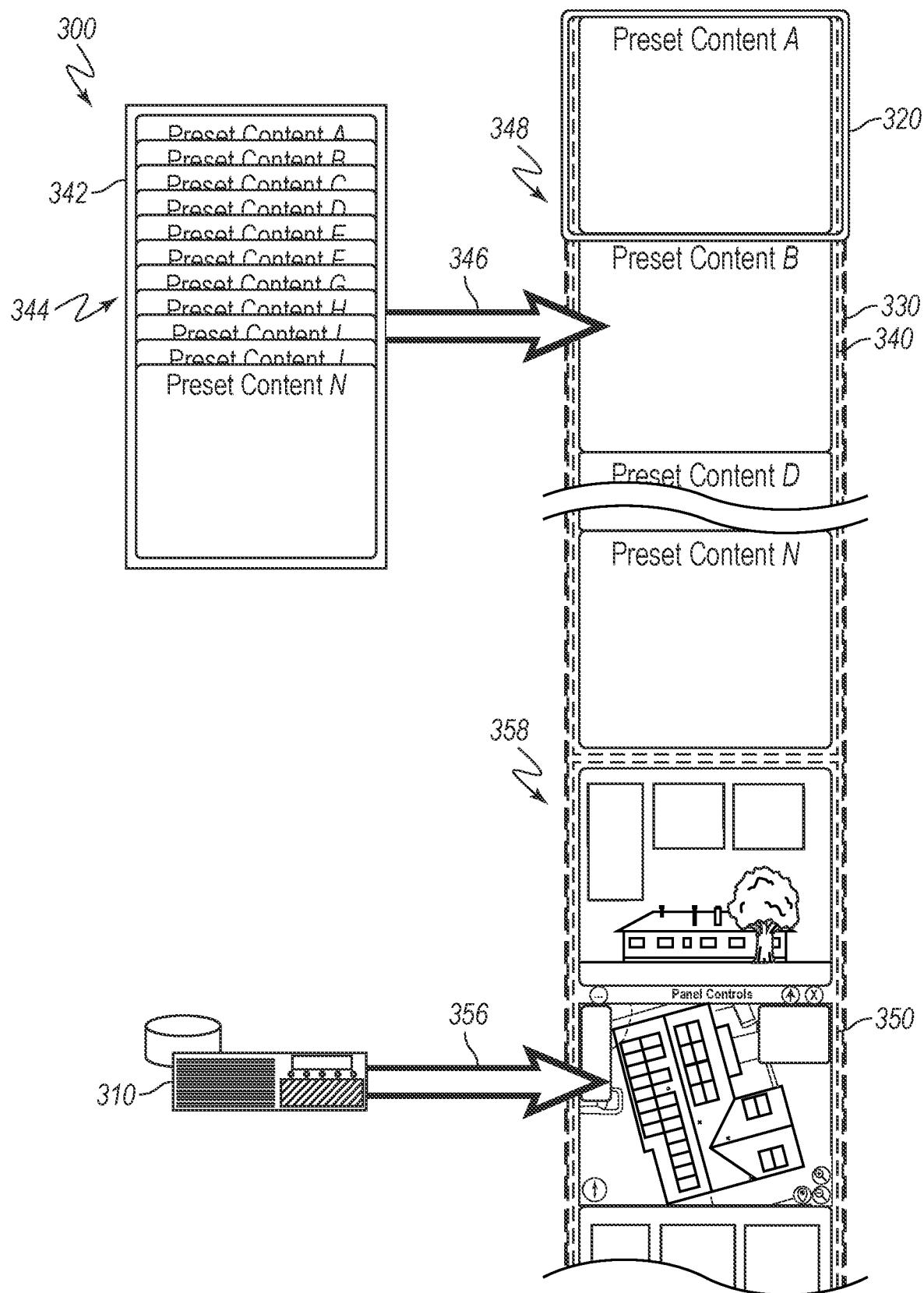
FIG. 3 is a diagram of a PPS, according to one embodiment of the present disclosure, wherein a platform provided by the PPS is configured to deliver information in advance of a proposal (e.g., a Preposal™) and a digital interactive solar proposal for a solar energy system.

FIG. 3 is a diagram of a project proposal system (PPS) 300, according to one embodiment of the present disclosure, wherein a platform 330 provided in conjunction with the PPS 300 is configured to deliver a Preposal™ 340 and a digital interactive solar proposal 358 for a solar energy system. The Preposal™ 340 and proposal 358 can be two different deliverables consolidated by the PPS 300 to the platform 330. According to one embodiment of the present disclosure, platform 330 may be configured such that the Preposal™ 340 and the proposal 358 appear as seamless presentation to a potential client. In other words, the PPS 300 generates a digital interactive proposal to present the proposed positioning of one or more elements of a proposed project, and any calculated benefits or results deriving from the proposed project. The ability to present the Preposal™ 340 and the proposal 358 seamlessly can facilitate both an education portion and a sales portion in presenting to the potential client, increasing a likelihood of a sales commitment. While a sales representative is presenting the Preposal™ 340, the PPS 300 informs the platform 330 as to processing and delivery time for the proposal 358, enabling the sales representative to effectively utilize time with the Preposal™ 340 and transitioning (apparently seamlessly) to the proposal 358.

The PPS 300 includes a PPS server 310 and a tablet computer 320, as shown. In one embodiment, the tablet computer 320 may be supplanted by a laptop computer, a desktop computer, or any appropriate personal computing device. The PPS server 310 may be similar in some respects to the PPS server 140 of FIG. 1. The tablet computer 320 may be similar in some respects to the tablet computer 150 of FIG. 1. The tablet computer 320 can comprise an electronic memory, a processor, a communication system, and a display module. The platform 330 can include the Preposal™ 340 and a container 350 for the interactive proposal 358. The platform 330 can be implemented, executed, or otherwise provided by the PPS 300 to render a presentation of the Preposal™ 340 and proposal 358 to the display module of the tablet computer 320. The platform 330 is shown in a representational form extending beyond the tablet computer 350 for ease of description and not as an actual physical state. A preset content library 342 is shown, and comprises a plurality of preset content modules 344. Each of the preset content modules 344 may contain text, graphics, and other data useful to educate a potential purchaser of a solar energy system on general terms regarding the process, the benefits, etc. of a solar energy system. A user of the tablet computer 320 may select one or more of the preset content modules 344 (selected preset content modules 348) for insertion 346 into or inclusion in the Preposal™ 340. The user may further order the selected preset content modules 348 as desired. In one embodiment, the user may be able to edit one or more of the selected preset content modules 348. In one embodiment, the user may be able to generate a custom preset content module to include with the selected preset content modules 348.

The platform 330 may be configured to accept input to identify a site (or a structure at a site) as a candidate for a solar energy system (or any suitable project, such as a roof installation, ground cover implementation, etc.), as well as to identify an owner or appropriate contact point (a potential client) for the site or structure. The platform 330 may be configured to deliver the site/structure information and the owner information to the PPS server 310. The PPS server 310 may generate one or more proposals 358 for installation of a solar energy system to the structure or site. Generation of a proposal 358 is described elsewhere herein. The PPS server 310 may generate the one or more proposals 358 at the same time that the user is using the platform 330 to render, present, or otherwise deliver the selected preset content modules 348 of the Preposal™ 340 to the potential client. In other words, while the user is showing the potential client the Preposal™ 340, the PPS server 310 may be generating the proposal(s) 358. Once the PPS server 310 generates the proposal(s) 358, the proposal(s) 358 may be injected 356 into the proposal container 350 of the platform 330. In a nominal situation, the proposal(s) 358 may be present in the platform 330 before the user and the potential client have finished reviewing or otherwise interacting with the Preposal™ 340, such that transition from the Preposal™ 340 to the proposal(s) 358 appears seamless to the potential client. The proposal(s) 358 may each include images, interactive images, text, financial analysis/-es, and/or other relevant sections to enable the potential client to make an informed decision (e.g., a purchase decision), to arrange ordering of solar energy equipment, arrange payment (including a payment plan and/or financing options), schedule any necessary permits, the actual installation, inspections, connections, etc.

Figure 4:
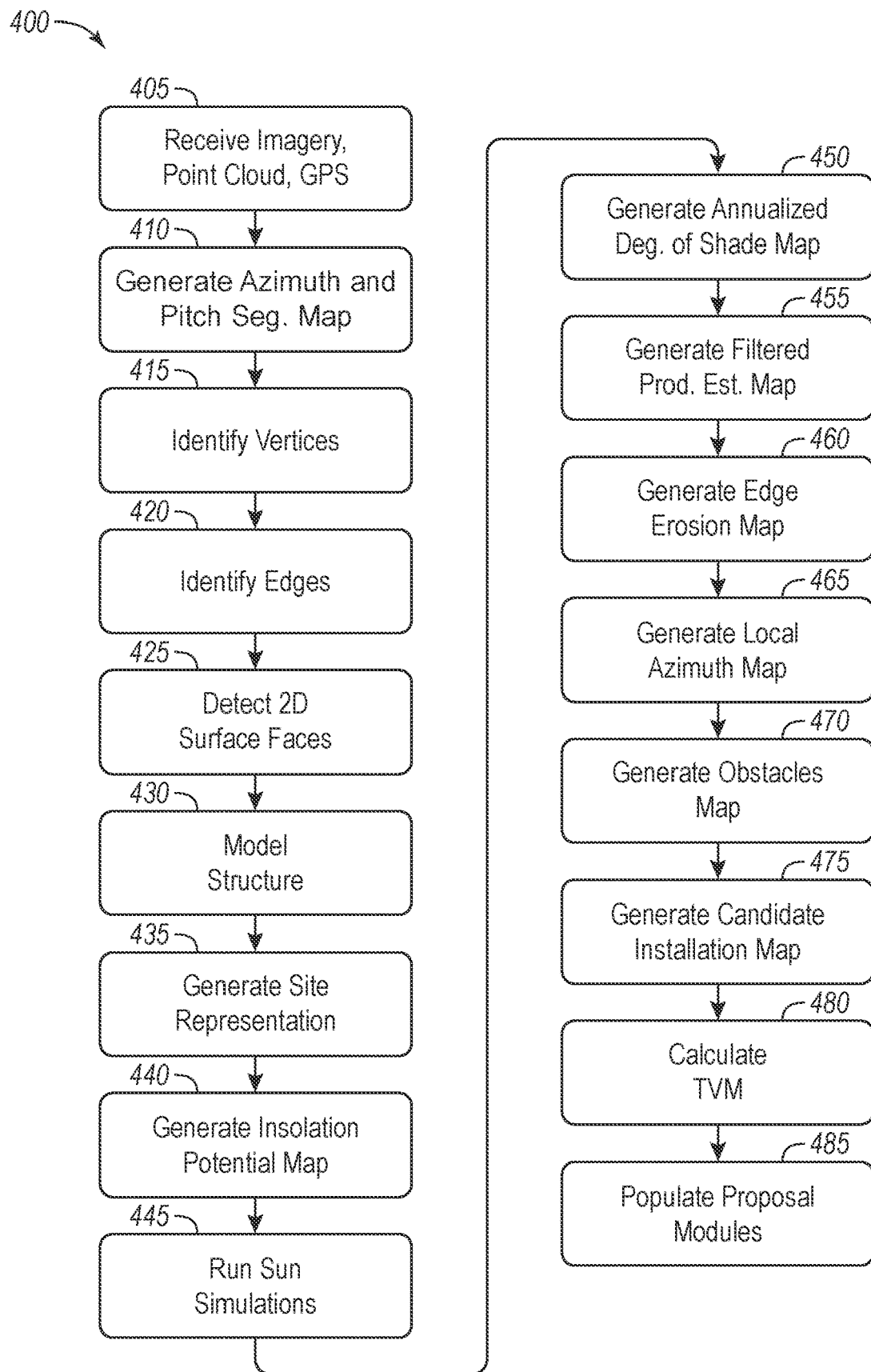
FIG. 4 is a flow diagram of a method of a PPS, according to one embodiment of the present disclosure, to generate and present a digital interactive solar proposal for installation of a solar energy system.

FIG. 4 is a flow diagram of a method 400 of a project proposal system (PPS), according to one embodiment of the present disclosure, to generate and present a digital interactive solar proposal (proposal) for installation of a solar energy system. The method 400 may be employed by a PPS such as the PPS 100, 200, 300 of FIGS. 1-3, respectively. The PPS may receive a request for a proposal of a project, such as for a solar energy system for a site or structure. The PPS receives 405 imagery, point cloud data, and/or GPS data for the site or structure for which a proposal may be requested. The imagery may comprise one or more of a nadir image, an orthographic composite image, stereoscopic images, video images, etc. In one embodiment, the PPS may generate the orthographic composite image. The point cloud data may be generated by the PPS, or may be provided by a vendor. In one embodiment, the PPS generates the point cloud based on the imagery. The point cloud comprises an arbitrary reference point located near a center of the structure or site, and from which all other points have a vector (direction and inclination) and a distance.

The PPS generates 410 an azimuth and pitch map by identifying a surface of interest, such as a roof, an area of ground, a definable space (such as above a pad or deck), etc. The PPS refines the surface of interest to surface faces (e.g., roof faces, terrain variations, elevation changes, etc.) The PPS identifies 415 vertices. The PPS may algorithmically (e.g., by GMM, RANSAC, PCA, MLESAC, etc.) identify clusters of points within the point cloud that may each represent an intersection of at least three planes. By way of non-limiting example, the PPS distinguishes points of the point cloud which represent a point of a roof surface of the structure from points which represent points of non-roof entities, then clusters together points which share characteristics indicative of representing a particular surface of the roof. Such characteristics may include a direction, an angle, and/or a distance from the arbitrary reference point, which suggest a plurality of points represent points in the same surface.

The PPS identifies 420 edges by constructing a bounding box circumscribing an array of next-point neighbors that represent an intersection between two planes within the point cloud, and also containing two vertices. A line defining an edge is algorithmically established between the two vertices along the intersection of the two planes. This line represents an edge extending between the two vertices. The PPS iterates this process until all edges have been identified and mapped.

The PPS detects 425 2D surface faces by relating together edges that have a common vertex. A polygon is generated for each surface defined by these common vertices. Each such polygon presents a perimeter shape of a particular face on the surface. The PPS resolves gaps between adjacent polygons, overlaps of a polygon on an adjacent polygon, etc. An algorithm may be applied to remove noise from the data (aberrant points of the point cloud) which may be the source of gaps and overlaps.

The PPS generates 430 a 3D model of the structure or site. Roof lines can be identified and classified based on how a given polygon relates to or interfaces with surrounding polygons. A footprint and walls of the structure may be combined with the polygons of the roof faces.

The PPS generates 435 a site representation by implementing a wide area point cloud. The wide area point cloud can include the structure and/or site (as a dense point cloud) and an appropriate amount of surrounding area to capture relevant features, such as may affect the project to be proposed. For example, for a solar electrical generation system, the wide area point cloud can include any surrounding features—obstructions, such as trees, neighboring structures, etc., that may cast shade on the surface of interest. The site representation may take the form of a mesh scene. A visualization of the site representation can be achieved via taking labeled (labeled as belonging to the roof, or the vertical walls) three-dimensional (3D) vertices (or coordinates) and using an earcut (or ear clipping) polygon triangulation algorithm to generate the geometry for displaying the mesh of the house.

The PPS generates 440 an insolation potential map, which describes the potential for insolation without regard for any intervening factors, such as, e.g., seasonal changes, obstructions, etc. In other words, the PPS generates 440 a map representing a maximum potential for insolation of the surface of interest with no interference.

The PPS then runs 445 sun simulations. A sun simulation determines a position of the sun relative to the structure or site at a particular time, and may iterate through a definable period of time to determine, from the site representation, the effect of obstructions and other features on the insolation potential map. An Euler transformation or a Ray Casting Mesh may be used to logically position the sun. Sun positions are gathered in zenith and azimuth angles) for a plurality of hours that is representative of phases or cycles (e.g., days, weeks, months, seasons, etc.) throughout the entirety of the year for the structure or site. The sun positions are filtered to daytime sun positions. The sun positions may be further filtered to multiple days of the year (e.g., summer and winter solstices).

The sun positions are simulated for the multiple days of the year to generate 450 a degree of shade map and/or find shade cast on one or more faces of the surface of interest. In other words, a digital sun is logically positioned relative to the site representation at a particular time (e.g., at a particular time of a particular day of the year) and the PPS determines the position of any shade cast on the surface of interest by any feature (obstruction) within the site representation. The PPS iterates through this digital sun logical positioning to obtain shade cast-data for meaningful periods of time, such as, e.g., for a solar maximum hour on a solar maximum day and a solar minimum hour on a solar minimum day wherein only daylight hours at the structure or site are considered. Any other meaningful time period may be employed, such as monthly, or weekly. The shade casting on the surface of interest is calculated for each point cloud point representing a location of the surface of interest. In one embodiment, the shade casting on the surface of interest may be calculated for a definable area, such as, e.g., a square foot, a square meter, an X-by-Y dimension, a fractional portion (e.g., one-quarter, one-eighth, etc.) of a face of the surface of interest, a face of the surface of interest, etc.

The PPS generates 455 a filtered production estimate map. The PPS 400 may calculate a benefit of installing one or more elements of the project to the one or more surfaces of interest or a portion of a definable space at a location based on an appropriate metric (e.g., solar production, cooling effect, etc.). In one embodiment, the PPS annualizes the solar hours per day. As discussed above, the imposition of shade at any position on the roof may be determined for each daylight hour of each day of the year to determine insolation while shaded for each daylight hour of each day. The insolation while shaded may be a diffuse insolation (e.g., 1%, 5%, 10%, 20%, etc.) of full insolation. By way of non-limiting example, the PPS may calculate an Insolation Value ("IV") (for a single point, an area, a face, etc.) by masking to only points of the surface of interest (a roof of a structure) and for each point to be included in the IV, sum the irradiation values of the shaded areas of the surface of interest to obtain a Total Irradiance Subset Where Shaded ("TISWS"), and calculate a Total Irradiance Subset ("TIS") minus TISWS, dividing by TIS, and multiplying by Total Yearly Irradiance ("TIY") (IV=(TIS-TISWS)/TIS)*TYI). The PPS may determine an annual insolation per roof point. For example, for each point of each face surface, the total insolation on the point is reduced by the total insolation when shaded, with the result divided by the total insolation, and that result is multiplied by the total yearly insolation. Stated otherwise, a point referenced solar access ratio (Insolation_in_shade/Insolation_no_shade) is calculated for each panel and summed across the whole system. By way of a non-limiting example, if 10% of the points inside a panel array are shaded such that the insolation transmitted to the panel is 80% less for those points, the summation that calculates the total transmitted insolation would contain an analog relationship between the reduction for each day of the year (instead of a generalized reduction as is currently being used for other solar access calculations).

The PPS generates 460 an edge erosion map. An edge erosion map, essentially takes into consideration any requirement for allowance of space (a setback) at each edge of each face of the surface of interest such that the useable space within a face is defined by the collective setbacks for each edge of the face. For example, a building code may require a setback at each roof edge, at a ridge, a hip, a valley, etc. The PPS considers such setback requirements to make a first determination of area within each face that may be useable for the project to be proposed (e.g., a solar energy system).

The PPS generates 465 an azimuth map. An azimuth relates a direction of a face of the surface of interest to a compass direction (i.e., an azimuth is a compass-relative (cardinal) orientation). In other words, in an ideal construction, two opposing roof faces may each have an azimuth relative to the opposite face of 180° (however, in practice, there may be a slight deviation such that the azimuth may be separated by something other than 180°). Furthermore, some esoteric surfaces may have pseudo-compound curves resulting in multiple faces to accomplish a turn of direction. Additionally, a surface of interest may have face orientations incidental to terrain or some other factor rather than as a result of construction.

The PPS generates 470 an obstacles map. The PPS identifies obstacles on, at, or near the surface of interest, including penetrations through the roof. Obstacles and penetrations may arise from, e.g., chimneys, vents, cooling equipment, antennae, etc. Obstacles affect potential disposition of solar panels on the roof. The PPS determines the area of each face of the roof surface. A total area of a face may be reduced by the existence of an obstacle or penetration at the particular face. The PPS determines, from the total area of a face (in view of the edge erosion map) an area of the face that is useable for installation of solar energy equipment or other project.

The PPS generates 475 at least one candidate installation map for the project to be proposed. The PPS acquires data related to the installation, erection, etc., of equipment to be implemented, such as, e.g., solar panel dimensions, connection requirements/limitations, costs, workmanship requirements, inspections, permits, etc. (equipment data). The equipment data comprises dimensions of the equipment, such as solar panels, that are candidates for installation to the surface of interest (a roof of the structure) or at the site. The PPS optimizes equipment placement for each appropriate roof face. For example, the PPS may consider each possible orientation of solar plans on each roof face. In other words, the PPS may consider orienting a longitudinal axis of the solar panels parallel to a side of roof surface, at a right angle to a side, or at any other suitable angle whereby solar energy production is optimized. The PPS determines a power production of solar energy from each potential disposition of solar panels. Optimizing solar panel placement and determining solar energy production may proceed iteratively in order to achieve a best result. Optimizing may include determining a minimum or maximum of a function, such as representing one or more of a placement, production, and/or cost.

According to one embodiment, the following approach can be used for calculating how many panels can be placed on a given roof face. The 3D point cloud polygon that represents the roof face can be converted to a 2D roof polygon using the dot product of the 3D polygon and a projection matrix that is calculated from the plane model's normal vector. From the 2D roof polygon, solar "panels" or "modules" can be placed onto the 2D roof polygon, using a bounding rectangle to place panels and "overflow" the roof face, as follows:

1. Create a "bounding rectangle" where the 4 points of that rectangle contain all 2D polygon points.
2. Determine based on the "bounding rectangle" length and "panel" length how many rows of panels we can fit.
3. Determine based on the "bounding rectangle" width and "panel" width how many columns of panels we can fit.
4. Iterate over the number of rows and columns to place a point for the center of each panel.
5. Remove any points where the panel will overlap the actual roof polygon and remove any points where there is an obstacle point that lies within the panel polygon.
   i. Convert numpy arrays to Python Shapely Polygons.
   ii. Iterate over each panel representing a Shapely Polygon to check for intersection between roof face edges and the panel. If intersected, remove the panel.

Lastly convert the 2D panel polygon and 2D panel center points back to 3D using the inverse matrix dot product as explained above. Then the 3D location data for each panel is saved in a database.

The PPS performs 480 time value of money ("TVM") calculations for each potential proposal (arrangement of equipment, e.g., solar panels). The PPS may obtain cost data from a variety of sources, such as, e.g., a solar energy system equipment vendor, an installer, a local power provider, local inspection authority, etc. The local power cost may be based on one or more of an area in which the site is situated, like structures served by the same (or a similar cost) power provider, estimated power used at the structure, and actual power consumption. The PPS can calculate a net cost to install each potential proposal, and a net value of production to determine a return-on-investment ("ROI"), etc. The PPS can calculate seasonal cost differentials, such as may arise from a capacity to sell back power during peak solar production periods. The PPS calculates energy production from one or more solar panels based on the insolation values at the area of the roof face occupied by the one or more solar panels.

The PPS may request or acquire equipment availability data. Said otherwise, the PPS may look at available inventory of solar panels so that a proposal may be based on equipment available within a definable time frame. The equipment availability data may comprise inventory-like data (equipment on hand at a supplier or suppliers), dimensional data, cost of acquisition, installation cost and scheduling, related fees (e.g., permitting, inspection(s), connection to grid, etc.), financing data, payment and payment options, and so forth. The TVM calculations 480 may provide a cost-benefit analysis for installing a solar energy system to the structure. The PPS renders output of the foregoing steps. The output may comprise one or more images of results of each step (e.g., a point cloud map, an insolation map, solar equipment disposition recommendation, etc.), cost analysis/-es. The output may be stored to a memory of the PPS server. The output may be formatted into a proposal. The proposal may be delivered for presentation to an owner of the structure or site.

The PPS populates 485 proposal modules for presentation via the platform. The proposal modules may include at least a base set of Preposal™ modules and proposal modules for each potential proposal. Stated simply, the PPS generates a digital (e.g., electronic) interactive proposal to present a proposed placement of the one or more solar panels and the calculated energy production. The digital interactive proposal may be generated based on one or more of the candidate installation map and/or the TVM calculations. The PPS may facilitate closing of a sale by, for example, enabling presentation of the proposal to a potential client (or customer) whereby the potential client becomes informed of one or more solar energy installation plans; and can provide a cost analysis for each installation plan, ordering components of a selected solar energy installation plan, scheduling (e.g., permit acquisition, inspections, connections, etc.), accepting or arranging payment (e.g., accepting a payment, arranging a payment schedule, arranging financing and coordinating distribution, etc.), and so forth. The PPS may enable presentation of the proposal by providing it over a communication network to a client computing device.

Following installation, the PPS may perform automated reviews and quality control operations. The PPS may, at given intervals, acquire actual or estimated solar energy productions data regarding the installed solar energy equipment, ongoing associated costs, etc. These data may be used to refine calculations, computations, or other functions performed by the PPS to improve service to future clients.

Figure 5:
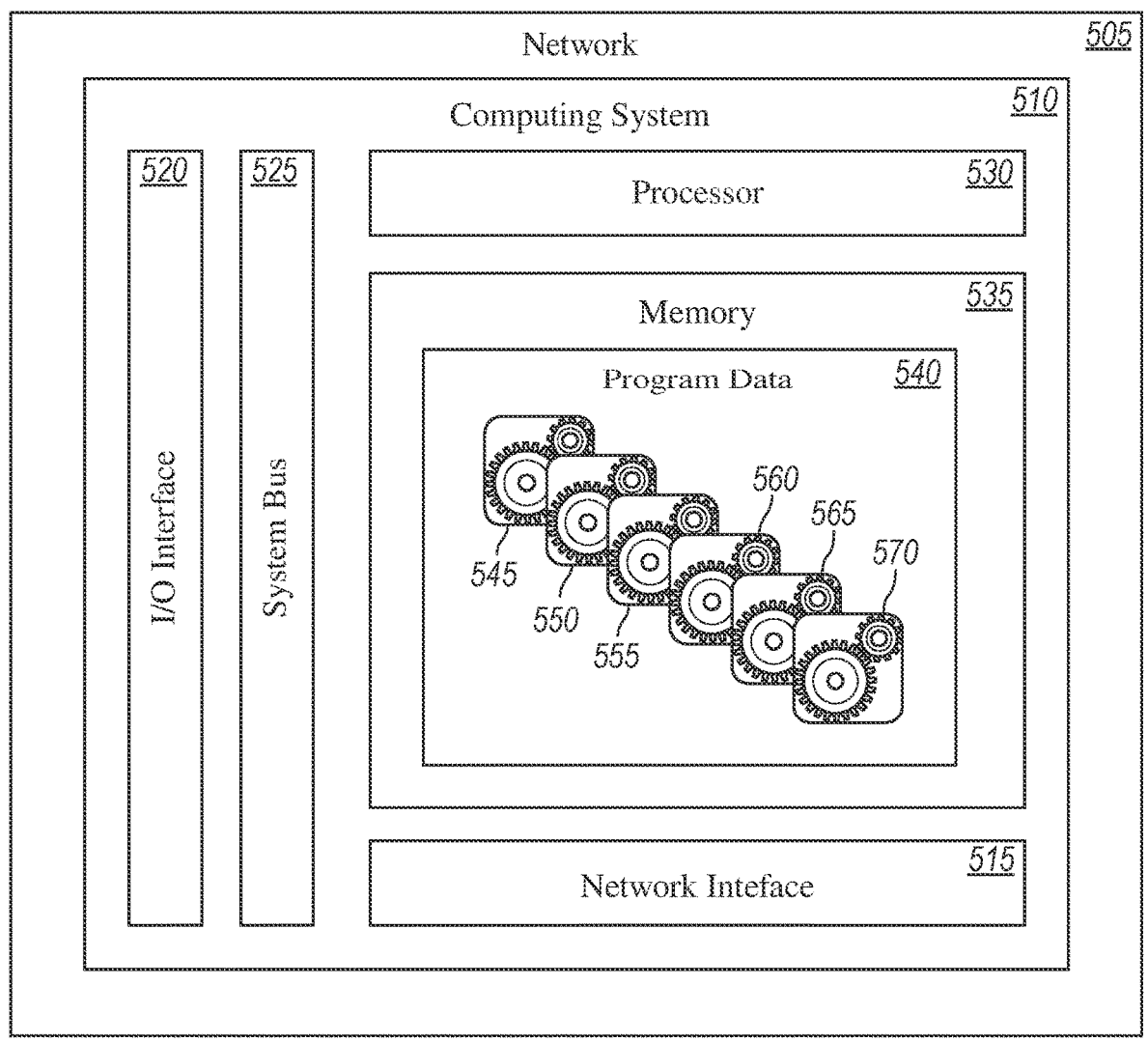
FIG. 5 diagrams an architecture of a PPS for generating a digital interactive project proposal for a structure, such as a solar energy system, according to an embodiment of the present disclosure.

FIG. 5 diagrams an architecture of a project proposal system (PPS) 500, such as the PPS 100, 200, 300 of FIGS. 1-3, respectively, for generating a digital interactive project proposal (proposal) for a structure, such as a solar energy system, according to an embodiment of the present disclosure. The PPS 500 includes a control server 510, hereafter referred to as a computing system 510, which may be similar in some respects to the PPS server 140 of FIG. 1. The PPS 500 comprises a network 505, and the computing system 510. The computing system 510 includes a system bus 525, one or more processors 530, an electronic memory 535, an input/output interface (I/O interface) 520, and a network interface 515. The PPS 500 may include and/or connect with a client computing device over the network 505 via the network interface 515. no The one or more processors 530 may include one or more general purpose devices, such as an Intel®, AMD®, or other standard microprocessor. The one or more processors 530 may include a special purpose processing device, such as ASIC, SoC, SiP, FPGA, PAL, PLA, FPLA, PLD, or other customized or programmable device. The one or more processors 530 may perform distributed (e.g., parallel) processing to execute or otherwise implement functionalities of the present embodiments. The one or more processors 530 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The electronic memory 535 may include static RAM, dynamic RAM, flash memory, one or more flip-flops, ROM, CD-ROM, DVD, disk, tape, or magnetic, optical, or other computer storage medium. The electronic memory 535 may include a plurality of program modules 545-570 and a program data 540. The electronic memory 535 may be local to the computing system 510 or may be remote from the computing system 510 and/or distributed over the network 505.

The program modules 545-570 may include all or portions of other elements of the PPS 500. The program modules 545-570 may run multiple operations concurrently or in parallel by or on the one or more processors 530. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein, may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like.

The program data 540 stored on the electronic memory 535 may include data generated by the PPS 500, such as by the program modules 545-570 or other modules. The stored program data 540 may be organized as one or more databases.

The I/O interface 520 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 515 may facilitate communication with other computing devices and/or networks 505, such as the Internet and/or other computing and/or communications networks. The network interface 515 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the computer may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 525 may facilitate communication and/or interaction between the other components of the PPS 500, including the one or more processors 530, the electronic memory 535, the I/O interface 520, and the network interface 515.

As noted, the PPS 500 includes various program modules 545-570 (or engines, elements, or components) (hereafter, "modules") to implement functionalities of the PPS 500 and to generate, access, and/or manipulate the program data 540 stored in the electronic memory 535. Each of the various modules 545-570 may comprise machine-readable instructions that may be read and used by the one or more processors 530 to perform various functions of the PPS 500. The modules 545-570 can include a vertex detection neural network ("VDN") 545, an edge detection neural network ("EDN") 550, a face detection engine ("FDE") 555, a 3D planes detection engine (3DE) 560, and other appropriate software modules 570, etc. The other appropriate software modules ("other modules") 570 may include disparate modules, such as an insolation analysis neural network (IAN), a placement geometry engine ("PGE"), a cost analysis module ("CAM"), a scheduling and monitoring module ("SMM"), etc. There may be more or fewer software modules 545-570 than shown in FIG. 5 and described herein.

The processor 530 is configurable to enable the processor 530 to read and execute computer-executable instructions, such as computer-executable instructions to perform the methods described herein. The computer-executable instructions may be stored in the memory 535, or in another memory accessible to the processor 530. The I/O interface 520 and/or the network interface 515 may enable to processor 530 to communicate with the memory 535 and/or another memory, and to communicate with, for example, a tablet computer, such as the tablet computer 150, 320 of, respectively, FIGS. 1 and 3, etc.

The memory 535 may store computer-readable and executable instructions to enable the processor 530 to perform the methods described herein. More particularly, the memory 535 may store instructions to enable the processor 530 to operate the VDN module 545 to generate, manipulate, interpolate, etc. a point cloud to identify each vertex representing an intersection of at least three planes in the point cloud model. The VDN module 545 may further enable the processor 530 to activate or employ the EDN module 550. The EDN module 550 may enable the processor 530 construct a bounding box around each array of next-neighbor points of the point cloud representing an intersection of two planes, and including two vertices. The EDN module 550 may further enable the processor 530 to define an edge of a polygon (representing an edge of a face of the surface of interest) from each line so identified. The EDN 550 may enable the processor 530 to employ the FDE 555 to construct a face of the surface of interest based on edges detected by the EDN 550. The FDE 555 may enable the processor 530 to employ the 3DE 560 to identify 3D planes representing faces of the surface of interest. The 3DE 560, in turn, may enable the processor 530 to employ the SIM 565 to run sun simulations relative to the site. The SIM 565 may enable the processor 530 to IAN to generate insolation data (as described elsewhere herein) relative to one or more of: each point of the point cloud representing a location at a face of the surface of interest, an array of points representing a definable area of a face of the surface of interest, an array of points representing entire area of a face of the surface of interest, an array of points representing a definable area of the surface of interest, the entire area of the surface of interest, etc. The IAN may enable the processor 530 to employ the PGE to ascertain one or more physical dispositions for equipment to be proposed for the project. The PGE may consider physical dimensions and/or geometry of the equipment, availability of equipment, etc., along with limitations imposed by, e.g., obstacles, setbacks, etc. The PGE may be recursively called by the processor 530 based on data that may be generated via the CAM. The PGE may generate data to be populated into a Preposal™ and/or proposal, such as images, text, etc. The PGE may enable the processor 530 to employ the CAM to perform a variety of cost analyses, including cost of implementation, TVM, ROI, FV-forecast, etc. The CAM may generate a cost table, an inventory table, etc., and at least some of the data generated by the CAM may be included in a proposal. The CAM, or another financial module, may also enable the processor 530 to perform financial transactions, such as to accept payment from a client, to remit payment to a vendor, etc. The CAM may enable the processor 530 to employ the SMM to perform scheduling of work and equipment to implement a project. The SMM may enable the processor 530 to, via the network interface 515 and the network 505, interact with vendors, contractors, etc., to request scheduling of equipment, installers, inspectors, etc. The SMM may further enable the processor 530 to interact with the client for scheduling and reporting purposes. The SMM and the CAM may each iteratively enable the processor 530 to invoke the SMM or the CAM to update relevant data of either module, as well as to invoke other modules as may, from time to time, be needed to perform the functions of the PPS 500. Additional other modules 570 are anticipated by the present disclosure.

The network interface 515 may enable communication of the results generated by the modules 545-570 to a memory for retention storage and/or to another system.

Figure 6A:
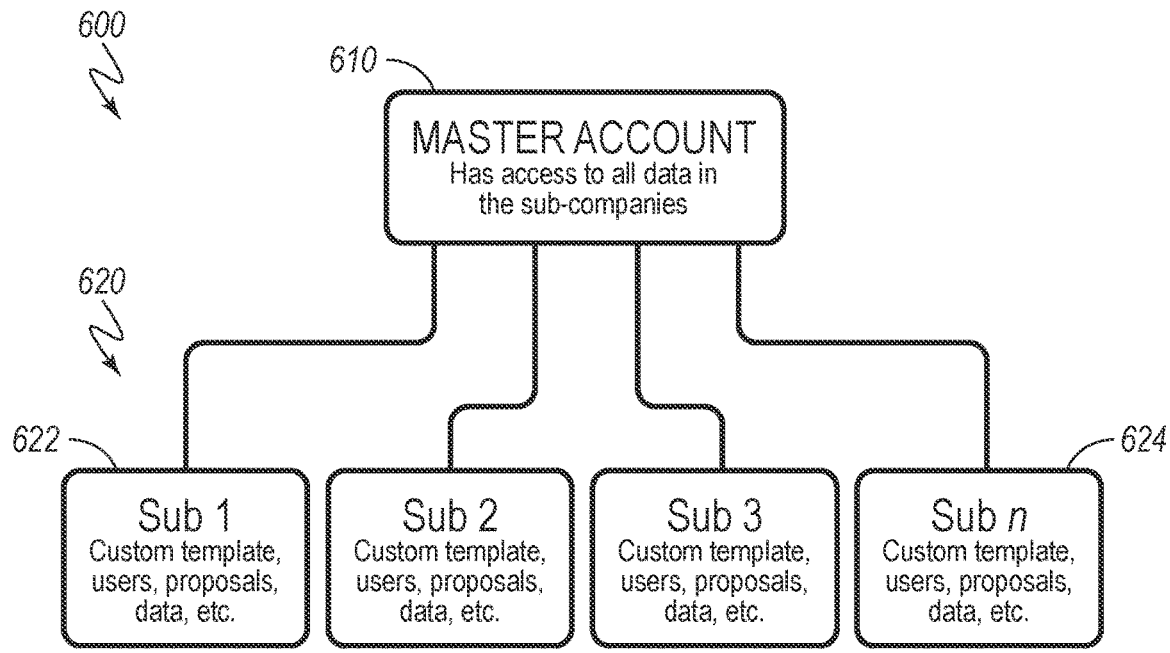
FIGS. 6A and 6B illustrate scenarios or models for interfacing with the platform of a system to propose a digital interactive proposal (a project proposal system "PPS"), such as the PPSs of FIGS. 1-5, according to an embodiment of the present disclosure.
Figure 6B:
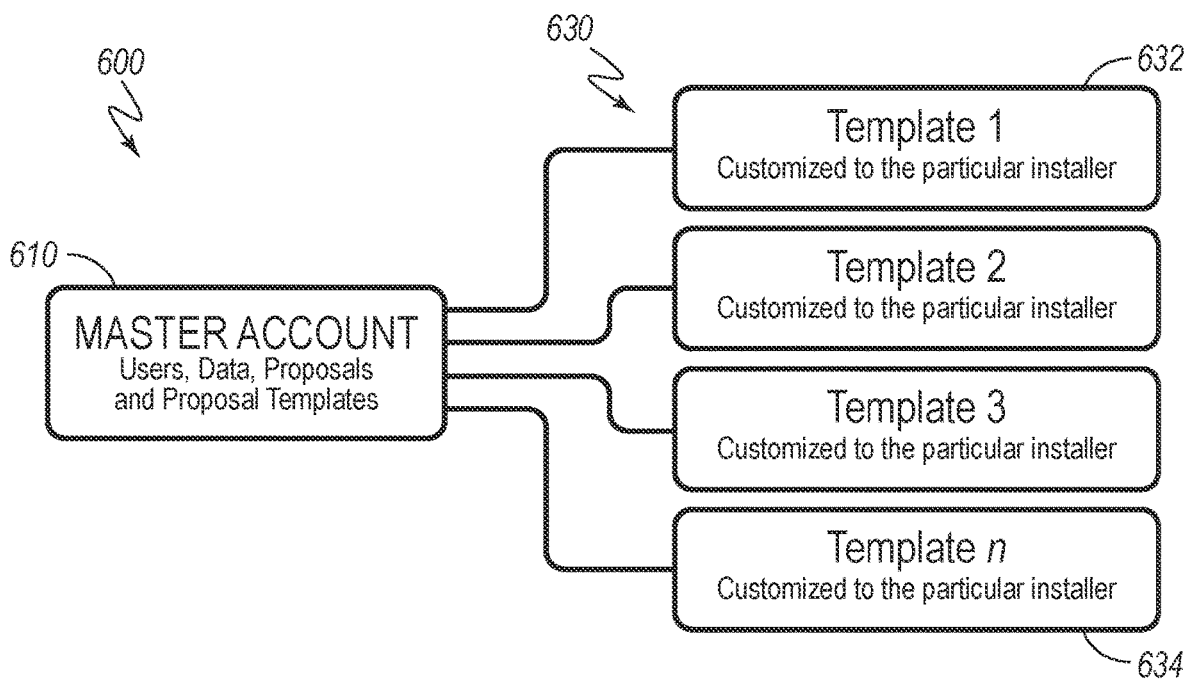

FIGS. 6A and 6B illustrate scenarios or models for interfacing with the platform of a system to propose a digital interactive proposal (a project proposal system "PPS"), such as the PPSs of FIGS. 1-5, according to an embodiment of the present disclosure. Through an entity onboarding process an ideal structure for the entity can be identified for interfacing with the platform. Consider four example scenarios: Installer model, Sales Org model, Hybrid, and Standard. Each scenario can signal or otherwise indicate how the platform should clone proposal templates and allow templates to inherit certain attributes, including but not limited to logos, imagery, custom pages, design preferences, restrictions imposed by an authority having jurisdiction (AHJ restrictions), fire setbacks, orientations, roof plane requirements, equipment, equipment scenarios, pricing redlines, pricing ceilings & floors, adders and their accompanying pricing logic, discounts, incentives, lending options, API credentials, document management, and others.

The above scenario (or model) structure allows a sales representative ("sales rep") to log into sales rep facing interface to the platform and order a pre/proposal with basic information. Based on company structure, geolocation, or some combination the sales representative is able to receive an automated Preposal™ and proposal template that fits a present selling scenario of the sales rep. When the request is submitted, it may enter a sophisticated queue system. A proposal engine of the platform can automate the design and populate data into an automated template. A quality assurance person can review the contents and then finish the process by digitally delivering the proposal to the end user via the platform, as described above with reference to FIG. 3.

In FIG. 6A, a relationship of data within or available to the PPS is 600 shown. A master account 610 may be accessed by an appropriate user, such as an administrator of an entity employing the PPS 600 to design and propose a project. A number of subordinate accounts (sub accounts) 620 are shown, with the sub account 622 representing a first sub account, and the sub account 624 representing a nth sub account. In other words, there may be any number of sub accounts 620 for the entity. Each sub account 620 is related to a collection of data and data structures. For example, each sub account 620 may be related to standard templates for use in designing and/or presenting a proposal, custom templates, users, a library of proposals (e.g., past proposals, current proposals, proposal shells, etc.), data related to each of these, etc. The templates, data, etc., may be used in conjunction with preset content for the platform, such as in conjunction with the preset content modules 344 of FIG. 3, to populate or configure a selected preset content module 348 (see FIG. 3), etc. In the context of FIGS. 6A and 6B, "related to" may mean any of the following: owns, controls, implements, uses, generates, receives, sends, etc. In other words, a user may access the first sub account 622 to interact with a proposal by using standard templates and custom templates, retrieving a current or past proposal, or a proposal shell, populating the proposal with data from various sources, transmit the proposal to, e.g., a sales rep, etc. The master account 610 has to all access of each of the sub accounts 620.

FIG. 6B depicts template access for the PPS 600. The master account 610, similar to having access to all sub accounts 620 of FIG. 6A, can access (including, creating, modifying, deleting, etc.) all templates 630 within the PPS 600. The PPS 500 may employ any number of templates 630. A first template 632 and a nth template 634 are identified. Each template 630 may relate to a particular vendor, supplier, installer, etc., that may be considered for a proposal being designed at the PPS 600. By way of non-limiting example, the first template 632 may relate to a supplier of solar energy system equipment and installation service. The first template 632 may include logos, login data, tax tables, scheduling data, etc., related to the particular supplier such that the template, when used with or as a selected preset content module 348, a presentation via the platform will display data related to the supplier, assisting in the apparent seam lessness of presenting the proposal to a potential client. The master account 610 may access, create, generate, edit, delete, etc., each template of the PPS 600. Each template 630 may also be associated to one or more of the sub accounts 620 of FIG. 6A.

EXAMPLES

Some examples of embodiments of the present disclosure are now provided.

Example 1. A system to generate a model of a definable space (e.g., at a location), comprising: a network interface to couple to one or more client computing devices over a communication network; memory to store one or more of imagery, point cloud data, and computer-readable instructions that when executed by a processor cause the system to perform operations; and one or more processors to execute the computer-readable instructions to cause the system to perform operations to: identify, within a point cloud for a definable space, perimeter points of one or more top surfaces of an object of interest in the definable space, based on imagery of the definable space, wherein the perimeter points are points of the point cloud; determine a perimeter of each top surface of the one or more top surfaces (e.g., based on the perimeter points); determine a two-dimensional (2D) face of each top surface of the one or more top surfaces; determine a three-dimensional (3D) plane of each top surface of the one or top surfaces; generate a representation of each top surface of the one or more top surfaces, based on the corresponding perimeter points, perimeter, two-dimensional face, and three dimensional plane; and join the representations of the one or more top surfaces to create a three-dimensional (3D) model of at least a portion of the object.

Example 2. The system of Example 1, wherein the one or more processors are further to execute the computer-readable instructions to cause the system to perform operations to receive point cloud data for the definable space, the point cloud data including the point cloud.

Example 3. The system of Example 1, wherein the one or more processors are further to execute the computer-readable instructions to cause the system to perform operations to: receive a plurality of two-dimensional orthogonal images of the definable space; and generate the point cloud data from the plurality of two-dimensional orthogonal images. Alternatively, the operations can be to receive stereo pair images of the definable space; and generate the point cloud data from the stereo pair images.

Example 4. The system of Example 1, wherein the one or more processors are further to execute the computer-readable instructions to cause the system to perform operations to add to the 3D model a representation of one or more vertical portions of the object of interest extending from the one or more top surfaces to one of a ground plane and another top surface of the one or more top surfaces.

Example 5. The system of Example 1, wherein the one or more processors are further to execute the computer-readable instructions to cause the system to perform operations to model the point cloud data to generate a site representation of the definable space, wherein the site representation includes the object of interest and one or more objects adjacent to the object of interest.

Example 6. The system of Example 1, wherein modeling the point cloud data to generate the site representation comprises generating a 3D mesh.

Example 7. The system of Example 1, wherein identifying the perimeter points of the one or more top surfaces comprises processing the imagery of the definable space with a vertex neural network trained to recognize vertices of top surfaces of the object of interest within the imagery of the definable space.

Example 8. The system of Example 1, wherein identifying the perimeter points of the one or more top surfaces comprises: processing the imagery of the definable space with a perimeter neural network trained to recognize a perimeter of a top surface; and identifying points of the point cloud that correspond to the perimeter.

Example 9. The system of Example 1, wherein determining the perimeter of each top surface is based on connecting the perimeter points.

Example 10. The system of Example 1, wherein determining the perimeter of each top surface comprises processing the imagery of the definable space with a perimeter neural network trained to recognize a perimeter of a top surface.

Example 11. A computer-implemented method to generate a model (e.g., of a site, definable space at a location), comprising: identifying, within a point cloud for a definable space, perimeter points of one or more top surfaces of an object of interest in the definable space, based on imagery of the definable space, wherein the perimeter points are points of the point cloud; determining a perimeter of each top surface of the one or more top surfaces; determining a two-dimensional (2D) face of each top surface of the one or more top surfaces; determining a three-dimensional (3D) plane of each top surface of the one or top surfaces; and generating a representation of each top surface of the one or more top surfaces, based on the corresponding perimeter points, perimeter, two-dimensional face, and three dimensional plane; and joining the representations of the one or more top surfaces to create a three-dimensional (3D) model of at least a portion of the object.

Example 12. The method of Example 11, further comprising: receiving point cloud data for the definable space, the point cloud data including the point cloud.

Example 13. The method of Example 11, further comprising: receiving a plurality of two-dimensional (e.g., orthogonal, stereo pair) images of the definable space; and generating the point cloud data from the plurality of two-dimensional images.

Example 14. The method of Example 11, further comprising adding to the 3D model a representation of one or more vertical portions of the object of interest extending from the one or more top surfaces to one of a ground plane and another top surface of the one or more top surfaces.

Example 15. The method of Example 11, further comprising modeling the point cloud data to generate a site representation of the definable space, wherein the site representation includes the object of interest and one or more objects adjacent to the object of interest.

Example 16. The method of Example 11, wherein modeling the point cloud data to generate the site representation comprises generating a 3D mesh.

Example 17. The method of Example 11, wherein modeling the point cloud data to generate the representation comprises generating a three-dimensional polyhedron model.

Example 18. The method of Example 11, wherein identifying the perimeter points of the one or more top surfaces comprises processing the imagery of the definable space with a vertex neural network trained to recognize vertices of top surfaces of the object of interest within the imagery of the definable space.

Example 19. The method of Example 11, wherein identifying the perimeter points of the one or more top surfaces comprises: processing the imagery of the definable space with a perimeter neural network trained to recognize a perimeter of a top surface; and identifying points of the point cloud that correspond to the perimeter.

Example 20. The method of Example 11, where in the imagery is one or more two-dimensional orthogonal composite images of the definable space.

Example 21. The method of Example 20, where in the one or more two-dimensional orthogonal composite images are created from a flattened version of the point cloud.

Example 22. The method of Example 11, wherein determining the perimeter of each top surface is based on connecting the perimeter points.

Example 23. The method of Example 11, wherein determining the perimeter of each top surface comprises processing the imagery of the definable space with a perimeter neural network trained to recognize a perimeter of a top surface.

Example 24. The method of Example 11, wherein determining the perimeter of each top surface comprises: processing the imagery of the definable space with a perimeter neural network trained to find a bounding shape for each top surface; algorithmically placing a set of the perimeter points inside of the bounding shape; and connecting perimeter points within each bounding shape to find the perimeter.

Example 25. The method of claim 306B, wherein finding the perimeter comprises determining the 2D face of the one or more top surfaces.

Example 26. The method of Example 11, wherein determining the two-dimensional (2D) face of each top surface comprises using a cycle basis algorithm.

Example 27. The method of Example 11, wherein determining a 3D plane of the one or more top surfaces comprises: using the 2D face of a given top surface of the one or more top surfaces to segment out points of the point cloud that belong to the given top surface; and determining a plane that runs through the points of the given top surface.

Example 28. The method of Example 27, wherein determining the plane comprises utilizing an iterative algorithm.

Example 29. The method of Example 27, wherein determining the plane comprises utilizing a random sample consensus algorithm.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented and/or arranged in combination in a single implementation. Conversely, various features that are described in the context of a single implementation can also be implemented and arranged in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having described some illustrative implementations, implementations, illustrative embodiments, and embodiments, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, arrangements, elements, or acts of the systems and methods herein referred to in the singular may also embrace implementations including a plurality of these elements, and any references in plural to any implementation, arrangement, element, or act herein may also embrace implementations including only a single element. References in the singular or plural form are not intended to limit the presently disclosed systems or methods, or their components, acts, or elements to single or plural configurations. References to any act or element being based on any information, act, or element may include implementations where the act or element is based at least in part on any information, act, or element.

It should be understood that no claim element herein is to be construed under the provisions of 35 U.S.C. § 112(f) unless the element is expressly recited using the phrase "means for."

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

It will be obvious to those having skill in the art that many changes may be made to the details of the above-described embodiments without departing from the underlying principles of the invention. The scope of the present invention should, therefore, be determined only by the following claims.

The invention claimed is:

1. A system to generate a model, comprising:
   a network interface to couple to one or more client computing devices over a communication network;
   memory to store one or more of imagery, point cloud data, and computer-readable instructions that when executed by a processor cause the system to perform operations; and
   one or more processors to execute the computer-readable instructions to cause the system to perform operations to:
   identify, within a point cloud for a definable space, perimeter points of a plurality of top surfaces of an object of interest in the definable space, based on imagery of the definable space, wherein the perimeter points are points of the point cloud;
   determine a perimeter of each top surface of the plurality of top surfaces;
   determine a two-dimensional (2D) face of each top surface of the plurality of top surfaces;
   determine a three-dimensional (3D) plane of each top surface of the plurality of top surfaces;
   generate a representation of each top surface of the plurality of top surfaces, based on the corresponding perimeter points, perimeter, two-dimensional face, and three-dimensional plane; and
   join the representations of the plurality of top surfaces to create a three-dimensional (3D) model of at least a portion of the object.

2. The system of claim 1, wherein the one or more processors are further to execute the computer-readable instructions to cause the system to perform operations to receive point cloud data for the definable space, the point cloud data including the point cloud.

3. The system of claim 1, wherein the one or more processors are further to execute the computer-readable instructions to cause the system to perform operations to:
   receive a plurality of two-dimensional images of the definable space; and
   generate the point cloud data from the plurality of two-dimensional images.

4. The system of claim 1, wherein the one or more processors are further to execute the computer-readable instructions to cause the system to perform operations to add to the 3D model a representation of one or more vertical portions of the object of interest extending from the plurality of top surfaces to one of a ground plane and another top surface of the plurality of top surfaces.

5. The system of claim 1, wherein the one or more processors are further to execute the computer-readable instructions to cause the system to perform operations to model the point cloud to generate a site representation of the definable space, wherein the site representation includes the object of interest and one or more objects adjacent to the object of interest.

6. The system of claim 1, wherein to model the point cloud to generate the site representation, the one or more processors are further to execute the computer-readable instructions to cause the system to perform operations to generate a 3D mesh.

7. The system of claim 1, wherein to identify the perimeter points of the plurality of top surfaces, the one or more processors are further to execute the computer-readable instructions to cause the system to perform operations to process the imagery of the definable space with a vertex neural network trained to recognize vertices of top surfaces of the object of interest within the imagery of the definable space.

8. The system of claim 1, wherein to identify the perimeter points of the plurality of top surfaces, the one or more processors are further to execute the computer-readable instructions to cause the system to perform operations to:
   process the imagery of the definable space with a perimeter neural network trained to recognize a perimeter of a top surface; and
   identify points of the point cloud that correspond to the perimeter.

9. The system of claim 1, wherein to determine the perimeter of each top surface, the one or more processors are further to execute the computer-readable instructions to cause the system to perform operations based on connecting the perimeter points.

10. The system of claim 1, wherein to determine the perimeter of each top surface, the one or more processors are further to execute the computer-readable instructions to cause the system to perform operations to process the imagery of the definable space with a perimeter neural network trained to recognize a perimeter of a top surface.

11. A computer-implemented method to generate a model, comprising:
   identifying, within a point cloud for a definable space, perimeter points of a plurality of top surfaces of an object of interest in the definable space, based on imagery of the definable space, wherein the perimeter points are points of the point cloud;
   determining a perimeter of each top surface of the plurality of top surfaces;
   determining a two-dimensional (2D) face of each top surface of the plurality of top surfaces;
   determining a three-dimensional (3D) plane of each top surface of the plurality of top surfaces; and
   generating a representation of each top surface of the plurality of top surfaces, based on the corresponding perimeter points, perimeter, two-dimensional face, and three dimensional plane; and joining the representations of the plurality of top surfaces to create a three-dimensional (3D) model of at least a portion of the object.

12. The method of claim 11, further comprising:

receiving point cloud data for the definable space, the point cloud data including the point cloud.

13. The method of claim 11, further comprising:

receiving a plurality of two-dimensional images of the definable space; and generating the point cloud from the plurality of two-dimensional images.

14. The method of claim 11, further comprising adding to the 3D model a representation of one or more vertical portions of the object of interest extending from the plurality of top surfaces to one of a ground plane and another top surface of the plurality of top surfaces.

15. The method of claim 11, further comprising modeling the point cloud to generate a site representation of the definable space, wherein the site representation includes the object of interest and one or more objects adjacent to the object of interest.

16. The method of claim 11, wherein modeling the point cloud to generate the site representation comprises generating a 3D mesh.

17. The method of claim 11, wherein identifying the perimeter points of the plurality of top surfaces comprises processing the imagery of the definable space with a vertex neural network trained to recognize vertices of top surfaces of the object of interest within the imagery of the definable space.

18. The method of claim 11, wherein determining the perimeter of each top surface is based on connecting the perimeter points.

19. The method of claim 11, wherein determining the two-dimensional (2D) face of each top surface comprises using a cycle basis algorithm.

20. The method of claim 11, wherein determining a 3D plane of the plurality of top surfaces comprises:

using the 2D face of a given top surface of the plurality of top surfaces to segment out points of the point cloud that belong to the given top surface; and determining a plane that runs through the points of the given top surface.

* * * * *